(12) United States Patent
Agiwal et al.

(10) Patent No.: US 12,213,161 B2
(45) Date of Patent: Jan. 28, 2025

(54) DEVICE TO DEVICE COMMUNICATION METHOD AND APPARATUS

(71) Applicant: Samsung Electronics Co., Ltd., Suwon-si (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/752,023

(22) Filed: May 24, 2022

(65) Prior Publication Data

US 2022/0287041 A1 Sep. 8, 2022

Related U.S. Application Data

(63) Continuation of application No. 17/086,824, filed on Nov. 2, 2020, now Pat. No. 11,388,726, which is a
(Continued)

(30) Foreign Application Priority Data

Jan. 17, 2014 (IN) .............................. 75/KOL/2014
Mar. 18, 2014 (IN) ............................. 338/KOL/2014

(51) Int. Cl.
*H04W 36/08* (2009.01)
*H04W 72/04* (2023.01)
(Continued)

(52) U.S. Cl.
CPC ........... *H04W 72/53* (2023.01); *H04W 72/04* (2013.01); *H04W 36/08* (2013.01); *H04W 72/23* (2023.01)

(58) Field of Classification Search
CPC ..... H04W 16/12; H04W 24/00; H04W 28/08; H04W 36/30; H04W 72/04
See application file for complete search history.

(56) References Cited

U.S. PATENT DOCUMENTS 8,885,507 B2   11/2014   Chen et al.
2012/0134344 A1   5/2012   Yu et al.
(Continued)

FOREIGN PATENT DOCUMENTS

CN   102792732 A   11/2012
CN   102792745 A   11/2012
(Continued)

OTHER PUBLICATIONS

ZTE Corporation, On resource allocation for D2D discovery, R2-134212, 3GPP TSG RAN WG2 #84, San Francisco, USA, Nov. 2, 2013.
(Continued)

*Primary Examiner* — Matthew W Genack
(74) *Attorney, Agent, or Firm* — Jefferson IP Law, LLP

(57) ABSTRACT

A device to device (D2D) communication apparatus and method are provided. The D2D communication apparatus includes a transceiver configured to receive resource configuration information indicating D2D resources configured in a serving cell from a base station (BS) of the serving cell, and a controller configured to determine locations of resources for transmission or reception of signals for D2D communication based on the resource configuration information. The resource configuration information includes information about length of common D2D resources configured in a plurality of cells and additional D2D resources configured in the serving cell and information about length of common and additional D2D resources of a cell that configures maximum-sized additional D2D resources among the serving cell and neighboring cells.

16 Claims, 27 Drawing Sheets

Related U.S. Application Data continuation of application No. 14/600,647, filed on Jan. 20, 2015, now Pat. No. 10,827,507.

(51) Int. Cl.
*H04W 72/23* (2023.01)
*H04W 72/53* (2023.01)

(56) References Cited

U.S. PATENT DOCUMENTS

| | | |
|---|---|---|
| 2012/0250636 A1 | 10/2012 | Wang et al. |
| 2012/0300662 A1 | 11/2012 | Wang et al. |
| 2013/0308551 A1 | 11/2013 | Madan et al. |
| 2014/0003262 A1 | 1/2014 | He et al. |
| 2014/0023008 A1 | 1/2014 | Ahn et al. |
| 2014/0038653 A1 | 2/2014 | Mildh et al. |
| 2014/0286293 A1 | 9/2014 | Jang et al. |
| 2015/0146687 A1 | 5/2015 | Kim et al. |
| 2016/0212793 A1 | 7/2016 | Jung et al. |
| 2016/0278152 A1 | 9/2016 | Lei et al. |
| 2016/0323868 A1 | 11/2016 | Kalhan et al. |
| 2016/0373915 A1 | 12/2016 | Kim et al. |

FOREIGN PATENT DOCUMENTS

| | | | |
|---|---|---|---|
| CN | 103379502 A | 10/2013 | |
| CN | 103428679 A | 12/2013 | |
| CN | 103493529 A | 1/2014 | |
| WO | 2012-091420 A2 | 7/2012 | |
| WO | 2012159270 A1 | 11/2012 | |
| WO | 2013077684 A1 | 5/2013 | |
| WO | WO-2014010956 A1 * | 1/2014 | ............... H04B 7/24 |

OTHER PUBLICATIONS

European Notice of Allowance dated Jun. 26, 2023, issued in European Patent Application No. 15737624.5.
Korean Office Action dated Aug. 7, 2023, issued in Korean Patent Application No. 10-2022-0010282.
Korean Trial Decision dated Jul. 28, 2022, issued in a counterpart Korean Application No. 2015-0008679.
Indian Office Action dated Sep. 5, 2022, issued in a counterpart Indian Application No. 202135022627.
Korean Office Action dated Dec. 26, 2023, issued in Korean Patent Application No. 10-2022-0010282.
Indian Hearing Notice dated Feb. 10, 2024, issued in Indian Patent Application No. 202135022627.
Chinese Notice of Allowance dated Jan. 20, 2023, issued in Chinese Patent Application No. 202010397684.9.
CATT, "Further discussion on resource allocation for D2D discovery", R1-135089, 3GPP TSG RAN WG1 Meeting #75, Nov. 1, 2013, pp. 1-8, San Francisco, USA.
ETRI, "Discussion on resource allocation for D2D discovery", R1-135279, 3GPP TSG RAN WG1 Meeting #75, Nov. 2, 2013, pp. 1-5, San Francisco, USA.
R1-135119, "On Resource Allocation for D2D Discovery", 3GPP TSG RAN WG1 Meeting #75, Nov. 11, 2013.
Samsung, Inter Cell Discovery, 3GPP TSG RAN WG2 Meeting #85, Feb. 10-14, 2014.
CN Examination Report dated Nov. 7, 2018 issued in CN Application 201580004976.9.
Korean Office Action dated Apr. 14, 2021, issued in a counterpart Korean Application No. 10-2015-0008679.
Alcatel-Lucent, Alcatel-Lucent Shanghai Bell; Discussion on D2D discovery; 3GPP TSG-RAN WG RAN3#83bis, R2-133485; Sep. 27, 2013, Ljubljana, Slovenia.
NTT DOCOMO, Inc.; Resource allocation for inter-cell D2D discovery; R1-134503; Sep. 28, 2013, Guangzhou, China.
3GPP TR 23.703 V0.8.0 (Nov. 2013); 3rd Generation Partnership Project; Technical Specification Group Services and System Aspects; Study on architecture enhancements to support Proximity-based Services (ProSe) (Release 12), Nov. 26, 2013.
Ericsson; Mobility for D2D UEs; 3GPP TSG-RA WG3 #82; R3-132277; Nov. 2, 2013, San Francisco, USA.
Korean Office Action dated Apr. 1, 2022, issued in a counterpart Korean Application No. 10-2022-0010282.
Korean Notice of Amendment Dismissal dated Apr. 9, 2024, issued in Korean Patent Application No. 10-2022-0010282.
Korean Office Action dated Apr. 9, 2024, issued in Korean Patent Application No. 10-2022-0010282.

* cited by examiner

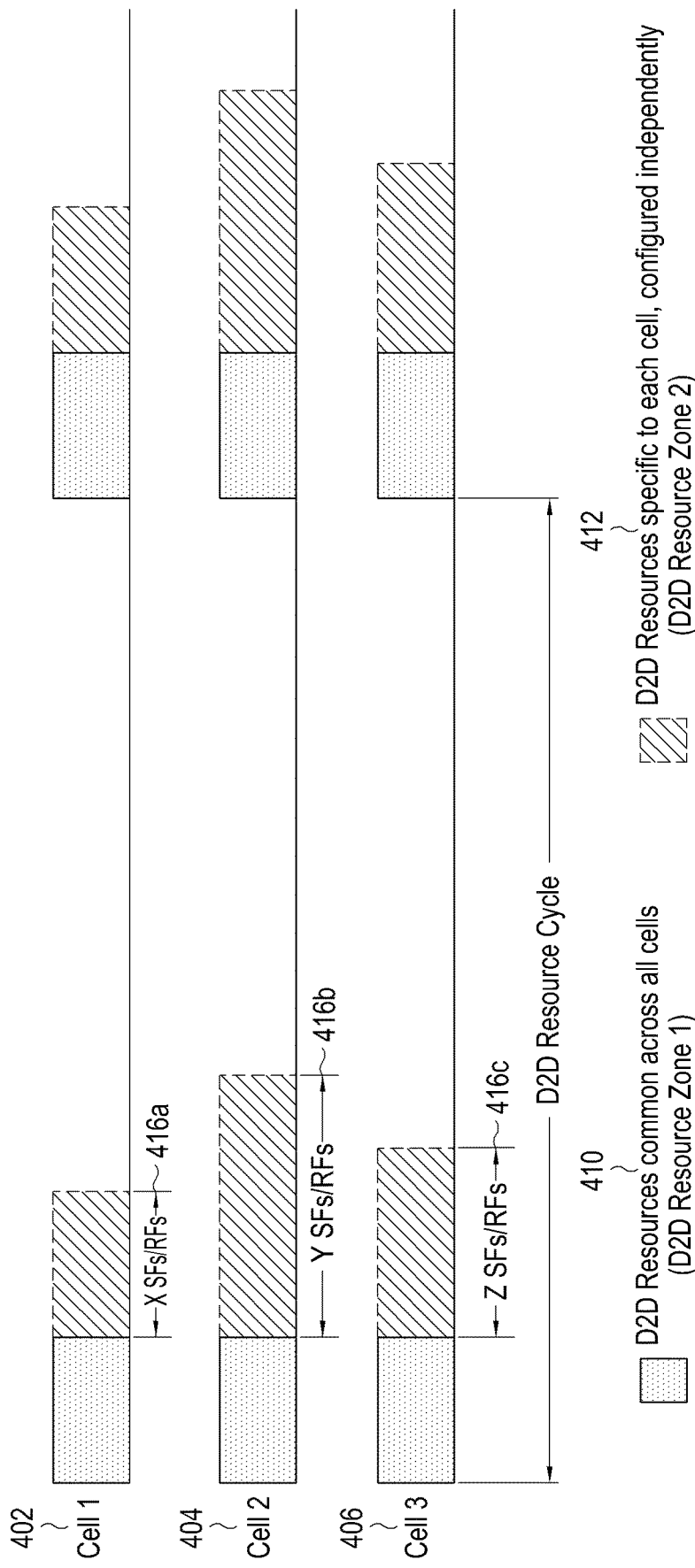

DEVICE TO DEVICE COMMUNICATION METHOD AND APPARATUS

CROSS-REFERENCE TO RELATED APPLICATION(S)

This application is a continuation application of prior application Ser. No. 17/086,824, filed on Nov. 2, 2020, which is a continuation application of prior application Ser. No. 14/600,647, filed on Jan. 20, 2015, which has been issued as U.S. Pat. No. 10,827,507 on Nov. 3, 2020, which claimed priority under 35 U.S.C. § 119(a) of an Indian patent application number 75/KOL/2014, filed on Jan. 17, 2014, in the Indian Patent Office, and of an Indian patent application number 338/KOL/2014, filed on Mar. 18, 2014, in the Indian Patent Office, the disclosure of each of which are incorporated by reference herein in their entireties.

TECHNICAL FIELD

The present disclosure relates to a device to device (D2D) communication method and an apparatus thereof. More particularly, the present disclosure relates to an apparatus and a method for configuring resources for D2D transmission and reception.

BACKGROUND

Recent popularization of smailphones drastically increases data traffic.

Since the number of smartphone users would grow more and applications services with the smailphones would be more revitalized, the mobile data traffic is expected to increase far more than the current mobile data traffic. Especially, if, beyond communications among people, even communications between people and remote devices, between remote devices, and the like, become brisk as a possible new market trend, the increase in traffic transmitted to a base station (BS) will be out of control.

As a technology to address this issue, a device to device (D2D) direct communication technology is recently drawing attention. The technology called D2D communication receives attention in both authorized area cellular mobile communications and unauthorized areas for Wireless Local Area Network (WLAN) communications.

Merging the D2D direct communications with the cellular mobile communications is noticeable in that it increases the BS's capability of traffic accommodation and reduces overload. Specifically, when mobile stations (MSs) or a plurality of user equipment (UEs) in the same cell or in adjacent cells establish a D2D link with one another and then directly exchange data via the D2D link without going through the BS or evolved NodeB (eNB), channels of communication may be reduced to one link, i.e., the link from one UE to another instead of two links, i.e., the link from a UE to the BS and the link from the BS to another UE.

D2D Discovery is a process performed by a D2D-enabled UE to determine whether the D2D-enabled UE is in proximity of another D2D-enabled UE. A discovering D2D-enabled UE determines whether or not another D2D-enabled UE is of interest to it using D2D Discovery. A D2D-enabled UE is of interest to a discovering D2D-enabled UE if its proximity needs to be known by one or more authorized applications on the discovering D2D-enabled UE.

For example, a social networking application can be enabled to use D2D discovery feature. The D2D discovery enables the D2D-enabled UE of a given user of a social networking application to discover and be discovered by the D2D-enabled UEs of his/her friends. In another example, the D2D discovery may enable the D2D-enabled UE of a given user of a search application to discover stores/restaurants, and the like, of its interest in its proximity.

D2D-enabled UE may discover other D2D-enabled UEs in its proximity by using direct UE-to-UE signaling. This is also referred to as D2D Direct Discovery. Alternatively, the communication network determines the proximity of two D2D-enabled UEs and informs them of their proximity. This is also referred to as network assisted D2D Discovery.

In order to perform D2D direct discovery, a BS configures the discovery resources in a semi static manner and broadcasts the discovery resource information in its cell. The D2D-enabled UEs in the cell uses this discovery resource information to transmit and receive the discovery signal. This D2D direct discovery requires system-wide pre-configuration of discovery resources in each cell. This leads to significant waste of precious resources. In addition to D2D direct discovery, minimizing the waste of resources is a very important technology in handling inter cell D2D transmission and reception for D2D communications between D2D-enabled UEs.

Therefore, a need exists for an apparatus and a method for configuring resources for D2D transmission and reception.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device to device (D2D) communication apparatus and a method thereof.

Another aspect of the present disclosure is to provide an apparatus and a method for configuring resources for D2D transmission and reception.

Another aspect of the present disclosure is to provide an apparatus and a method for managing resources for D2D discovery.

In accordance with an aspect of the present disclosure, a D2D communication method is provided. The method includes receiving resource configuration information broadcasted in a serving cell from a base station of the serving cell, the resource configuration information indicating at least one of D2D transmission resources or D2D reception resources, transmitting D2D signal based on the D2D transmission resources indicated in the resource configuration information, and receiving D2D signal based on the D2D reception resources indicated in the resource configuration information.

In accordance with another aspect of the present disclosure, a D2D communication method is provided. The method includes generating resource configuration information indicating at least one of D2D transmission resources or D2D reception resources, and transmitting the resource configuration information to at least one user equipment (UE) in a serving cell, wherein the D2D transmission resources are used for transmitting D2D signal by the at least one UE in the serving cell, and the D2D reception resources are used for receiving D2D signal by the at least one UE in the serving cell.

In accordance with another aspect of the present disclosure, a D2D communication apparatus is provided. The apparatus includes a transceiver configured to receive resource configuration information broadcasted in a serving cell from a base station of the serving cell, the resource configuration information indicating at least one of D2D transmission resources or D2D reception resources, to transmit D2D signal based on the D2D transmission resources indicated in the resource configuration information, and to receive D2D signal based on the D2D reception resources indicated in the resource configuration information, and a controller configured to determine the D2D transmission resources and the D2D reception resources based on the resource configuration information.

In accordance with another aspect of the present disclosure, a D2D communication apparatus is provided. The apparatus includes a controller configured to generate resource configuration information indicating at least one of D2D transmission resources or D2D reception resources, and a transceiver configured to transmit the resource configuration information to at least one UE in a serving cell, wherein the D2D transmission resources are used for transmitting D2D signal by the at least one UE in the serving cell, and wherein the D2D reception resources are used for receiving D2D signal by the at least one UE in the serving cell.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, 4C, and 4D illustrate diagrams of signaling schemes for D2D resource pools according to embodiments of the present disclosure;

Throughout the drawings, like reference numerals will be understood to refer to like parts, components, and structures.

DETAILED DESCRIPTION

Figure 1A:
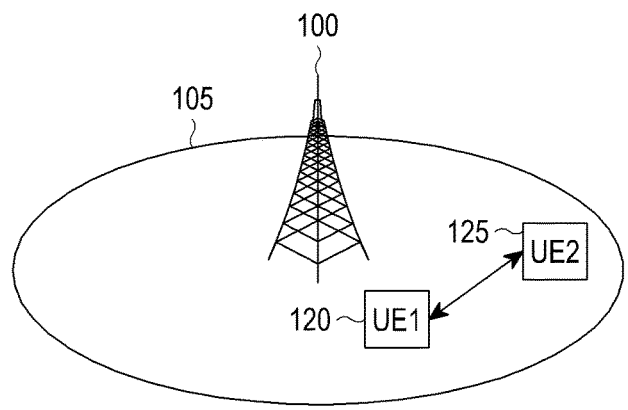
FIG. 1A illustrates a device to device (D2D) discovery scenario among a plurality of D2D-enabled User Equipment (UEs) in a same cell according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Technological content well-known in the art or not directly related to the present disclosure is omitted in the following description. Through the omission of content that might otherwise obscure the subject matter of the present disclosure, the subject matter will be understood more clearly.

For the same reason, some parts in the accompanying drawings are exaggerated, omitted or schematically illustrated. The size of the respective elements may not reflect their actual size. Like numbers refer to like elements throughout the drawings.

Advantages, features and methods for achieving them will be understood more clearly when the following embodiments are read with reference to the accompanying drawings. The embodiments of the disclosure may, however, be embodied in many different forms and should not be construed as limited to the embodiments set forth herein. Rather, these embodiments are provided so that this disclosure will be thorough and complete, and will fully convey the scope of the embodiments of the disclosure to those skilled in the art. Like numbers refer to like elements throughout the specification.

It is understood that each blocks and combination of the blocks of a flowchart may be performed by computer program instructions. The computer program instructions may be loaded on a processor of a universal computer, a special-purpose computer, or other programmable data processing equipment, and thus they generate a method for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction used for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments. For example, two successive blocks may be performed substantially at the same time or in reverse order.

The term "module" (or sometimes "unit") as used herein refers to a software or hardware component, such as Field Programmable Gate Array (FPGA) or Application Specific Integrated Circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcode, circuits, data, databases, data structures, tables, arrays, and variables.

Functions served by components and modules may be combined into a less number of components and modules, or further divided into a more number of components and modules. Moreover, the components and modules may be implemented to execute one or more Central Processing Units (CPUs) in a device or security multimedia card.

While, embodiments of the present disclosure are mainly applied to Long Term Evolution (LTE) systems in the following description, they may be also applicable to any other communication systems and services within the scope of the present disclosure.

There are two main scenarios for device to device (D2D) direct discovery amongst the plurality of D2D-enabled User Equipment (UEs) (or D2D UEs) within a network coverage. In the first scenario, a D2D UE in one cell discovers another D2D UE in the same cell. In the second scenario, D2D UEs in proximity are in different cells and able to discover each other.

FIG. 1A illustrates a D2D discovery scenario among D2D-enabled UEs in a same cell according to an embodiment of the present disclosure. As illustrated, there are D2D-enabled UEs 120, 125 (or called D2D UEs) in a cell 105 covered by a base station (BS) 100, and the D2D UEs 120, 125 may each discover the other D2D UE.

In order to perform D2D direct discovery in the coverage, the BS may configure the discovery resources in a semi static manner and broadcast the discovery resource information in its cell. The D2D UEs 120, 125 in the cell may use this discovery resource information to transmit and receive discovery signals.

Figure 1B:
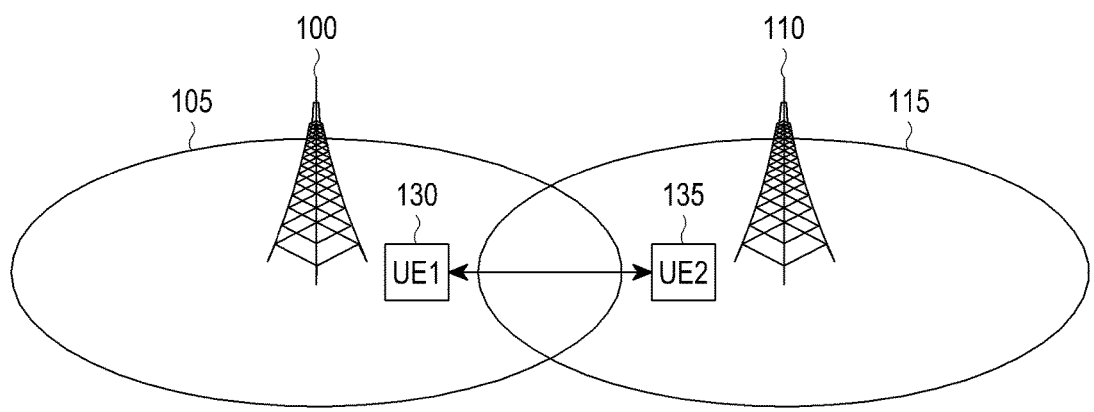
FIG. 1B illustrates a D2D discovery scenario among D2D-enabled UEs in different cells according to an embodiment of the present disclosure.

FIG. 1B illustrates a D2D discovery scenario among D2D-enabled UEs in different cells according to an embodiment of the present disclosure. As illustrated, there are D2D UE 130 located in the cell 105 covered by the BS 100 and D2D UE 135 located in a cell 115 covered by a BS 110, and the D2D UEs 130, 135 may each discover the other D2D UE.

In case of the inter cell discovery as illustrated in FIG. 1B, it is to be determined which discovery resources are used by the transmitting D2D UE 130 and which discovery resources are used by the receiving UE 135. If the transmitting D2D UE 130 transmits discovery signals in the discovery resources of its cell 105 and the receiving D2D UE 135 tries to receive the discovery signals in the discovery resources of its cell 115, inter cell discovery may not be possible.

Figure 2:
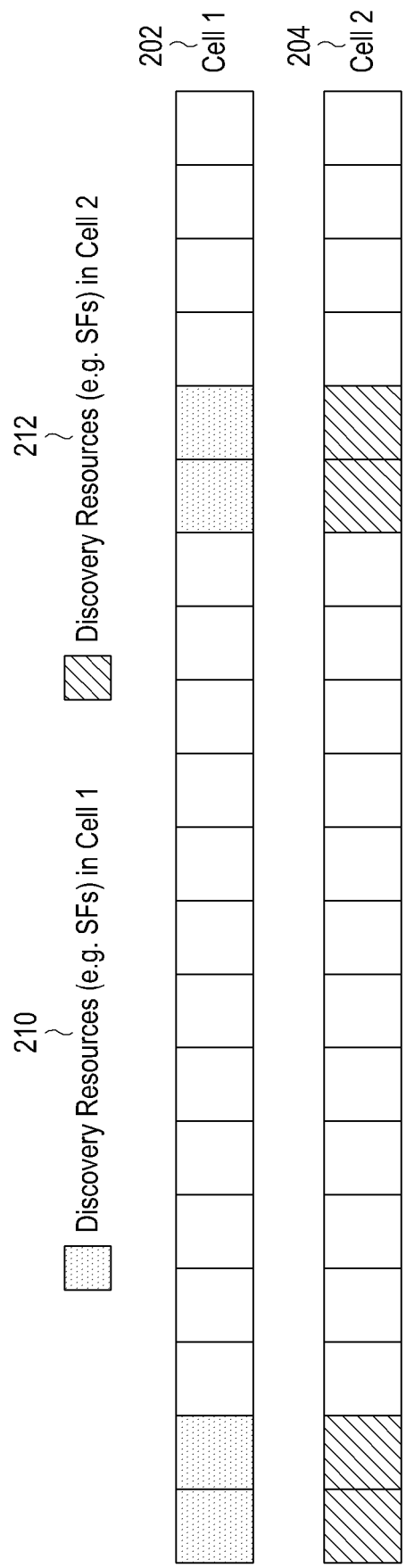
FIG. 2 illustrates a configuration of same discovery resources across cells according to an embodiment of the present disclosure.

FIG. 2 illustrates a configuration of same discovery resources across cells according to an embodiment of the present disclosure. As illustrated, resources 210. e.g., subframes (SFs) allocated for discovery in a cell 1 202, are the same as resources 212 allocated for discovery in a cell 2 204.

In the configuration scheme of FIG. 2, system-wide pre-configuration of the same discovery resources is required across all the cells, and discovery resources in each cell may not be reconfigured based on the discovery load in the cell. In addition to D2D device discovery, the above issue may exist in any type of D2D communication between D2D UEs across cells.

In the following embodiments, resource configuration for inter cell D2D transmission and reception will be provided.

Specifically, a set of D2D resources for D2D, e.g., for D2D discovery message transmission/reception and/or D2D communication data/control packet transmission/reception may be configured to be common across all the cells. This set of D2D resources is referred to as 'D2D resource zone 1' or 'common D2D resources'. In addition to the 'D2D resource zone 1', each cell may configure additional D2D resources whenever required. In an embodiment of the present disclosure, the additional D2D resources may be located immediately after the D2D resource zone 1, i.e., common D2D resources. In another embodiment of the present disclosure, the additional D2D resources may not be located immediately after the D2D resource zone 1. The additional D2D resources are referred to as 'D2D resource zone 2'.

Figure 3:
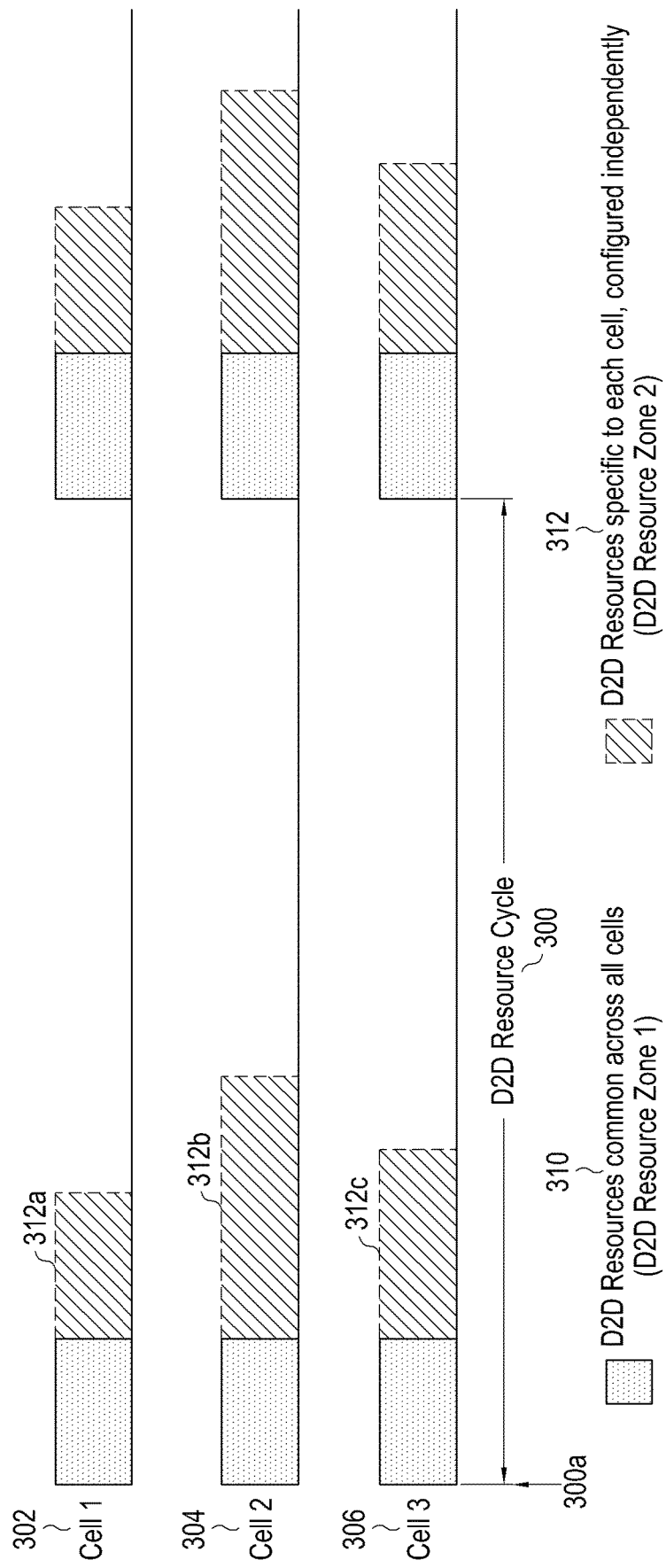
FIG. 3 illustrates a D2D resource configuration according to an embodiment of the present disclosure.

FIG. 3 illustrates a D2D resource configuration according to an embodiment of the present disclosure. While the embodiment of FIG. 3 illustrates three cells 302, 304, 306 in the system, it is obvious that the same resource configuration scheme is applicable to a case where there are more number of cells.

Referring to FIG. 3, a cell 1 302, a cell 2 304, and a cell 3 306 have the same common D2D resources, i.e., a D2D resource zone 1 310, and additional D2D resources specific to each cell, i.e., a D2D resource zone 2 312 (312a, 312b, 312c) may be independently configured. The duration 300 and a start 300a of a cycle in which the D2D resources are allocated (hereinafter, referred to as a D2D resource cycle) is the same across all the cells 302, 304, 306. D2D resource zone 1 310 and D2D resource zone 2 312 may be time division multiplexed or frequency division multiplexed.

Each of the cells 302, 304, 306 interacts with its neighboring cells and recognizes the additional D2D resources (i.e., a D2D resource zone 2) configured in the neighboring cells. Such determination may be done using an X2 interface between BSs.

Each cell may broadcast information to assist the UE for inter cell D2D operation. The information broadcasted from the cell indicates D2D transmission resources (that is D2D resources) configured in the cell. The D2D transmission resources may comprise of Type 1 D2D transmission resources being non UE specific resources. The UE camped to the cell may use the D2D transmission resources broadcasted by the cell for D2D transmission in an idle state or if dedicated resources are not assigned.

a) Information About D2D Transmission Resources

This indicates D2D Resources configured for D2D transmissions in the cell. The D2D resources configured in the cell comprises of D2D resources in a D2D Resource Zone 1 and a D2D Resource Zone 2 of the cell. The D2D resources in the D2D Resource Zone 1 of the cell comprise of resources common across all the cells. The D2D resources in the D2D Resource Zone 2 of the cell comprises of additional D2D Resources configured in the cell. In one embodiment of the present disclosure, a D2D UE camped to a cell uses these D2D transmission resources for transmitting a D2D signal (e.g., a discovery signal in case the D2D resources are discovery resources). In another embodiment of the present disclosure, a D2D UE camped to a cell uses these D2D transmission resources for transmitting a D2D signal on the same radio frequency as the radio frequency of camped cell. The camped cell is also referred as serving cell.

The D2D transmission resources may be further divided into Type 1 and Type 2 D2D resources, wherein the Type 1 D2D resources are common D2D resources and Type 2 D2D resources are dedicated D2D resources. The D2D UE may use Type 1 D2D resources for transmission if it has not been allocated dedicated resources or if it is in idle state. In an embodiment of the present disclosure, D2D resource zone 1 may be comprised of Type 1 D2D resources, and D2D resource zone 2 may be comprised of Type 2 D2D resources. In another embodiment of the present disclosure, Type 1 and Type 2 D2D resources may be independent of the D2D resource zones. In yet another embodiment of the present disclosure, the D2D transmission resources broadcasted by a cell may be comprised of Type 1 D2D resources only or Type 2 D2D resources only.

b) Information About D2D Reception Resources

This indicates D2D resources configured for D2D transmissions in the cell and its neighbor cells. In one embodiment of the present disclosure, this indicates D2D resources configured for D2D transmissions in the cell and its neighbor cells on the same radio frequency as the radio frequency of the cell. The D2D reception resources comprises of D2D resources common across all the cells (i.e., a D2D resource zone 1) and additional D2D Resources i.e., a D2D resource zone 2 of a cell (among itself and its neighboring cells) which has configured the maximum additional D2D resources. In another embodiment of the present disclosure, the D2D reception resources may be comprised of D2D resources common across all the cells (i.e., a D2D resource zone 1) and the sum of additional D2D resources i.e., a D2D resource zone 2 of the cell and its neighboring cells.

In one embodiment of the present disclosure, the D2D UE camped to a cell uses the D2D reception resources broadcasted by the cell for receiving D2D signals transmitted by other D2D UE(s). In another embodiment of the present disclosure, the D2D UE camped to a cell uses the D2D reception resources broadcasted by the camped cell for receiving D2D signals transmitted by other D2D UE(s) on the same radio frequency as the radio frequency of the camped cell. In an embodiment of the present disclosure, the D2D reception resources broadcasted by the cell comprises of Type 1 D2D resources and Type 2 D2D resources.

Embodiments of signaling schemes for the D2D transmission resources and D2D reception resources will now be described.

In an embodiment of the present disclosure, a BS, i.e., a cell may signal information about the length of its D2D resource zone 1 and D2D resource zone 2. The length may be represented by the number of SFs or radio frames (RFs). The BS may also signal the length of D2D resource zone 1 and the length of D2D resource zone 2 of a cell, among itself and its neighboring cells, which has configured the maximum-sized additional D2D resources.

Figure 4A:
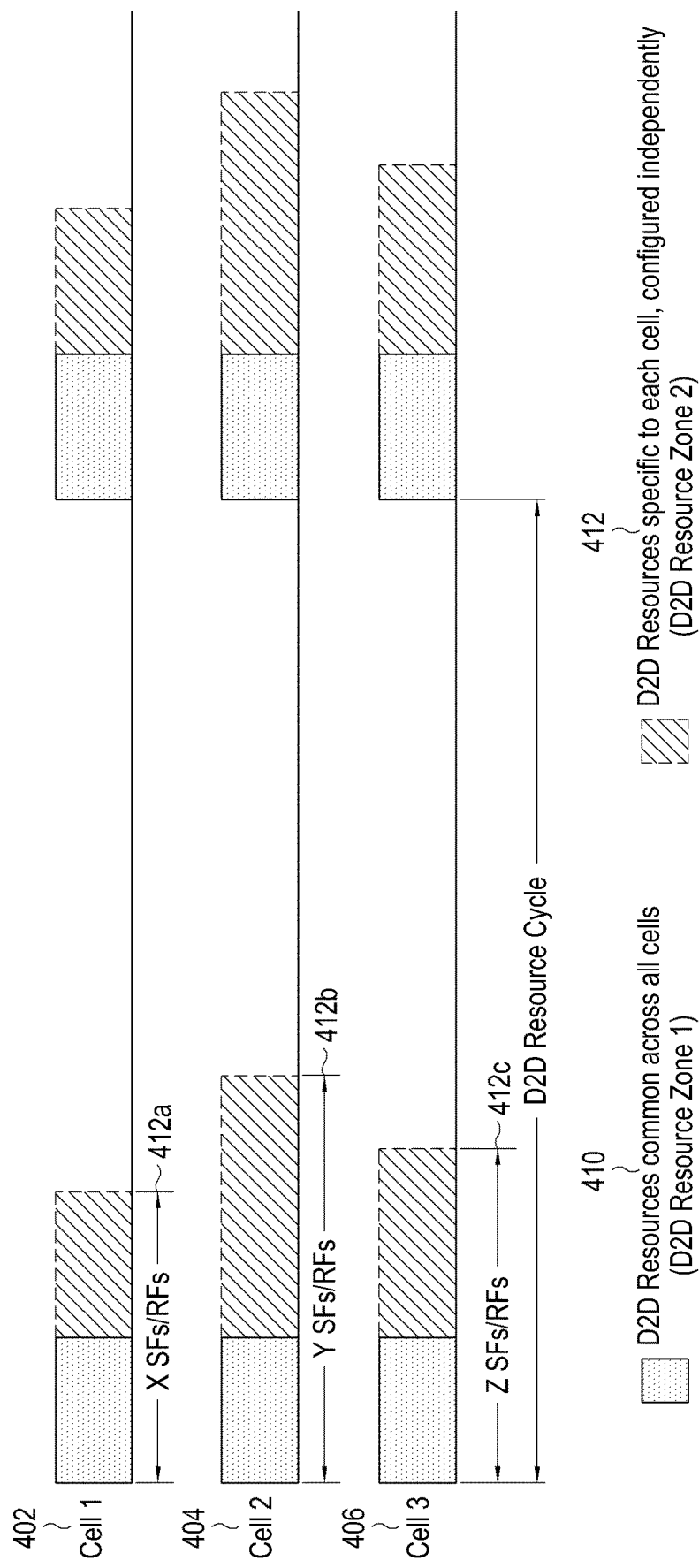

FIG. 4A is a diagram illustrating a signaling scheme for D2D transmission resources and D2D reception resources according to an embodiment of the present disclosure.

Referring to FIG. 4, a cell 1 402, a cell 2 404, and a cell 3 406 have the same common D2D resources, i.e., D2D resource zone 1 410, and additional D2D resources specific to the respective cells, i.e., D2D resource zone 2 412 may be independently configured. The cell 1 402 may broadcast information X 412a to indicate the D2D transmission resources and information Y 412b to indicate the D2D reception resources.

The cell 2 404 may broadcast information Y 412b to indicate D2D transmission and D2D reception resources, and the cell 3 406 may broadcast information Z 412c to indicate D2D transmission resources and information Y 412b to indicate D2D reception resources. In the case the transmission resources is comprised of type 1 and type 2 resources, the cell 1 402 may signal [X-(type 2 resources)] instead of X, as the information about the D2D transmission resources. The cells 2 and 3 may signal in the same way.

In another embodiment of the present disclosure, a BS, i.e., a cell may signal information about the length of its D2D resource zone 1 and D2D resource zone 2. The BS may also signal a difference (delta) between D2D transmission resource and D2D reception resources.

Figure 4B:
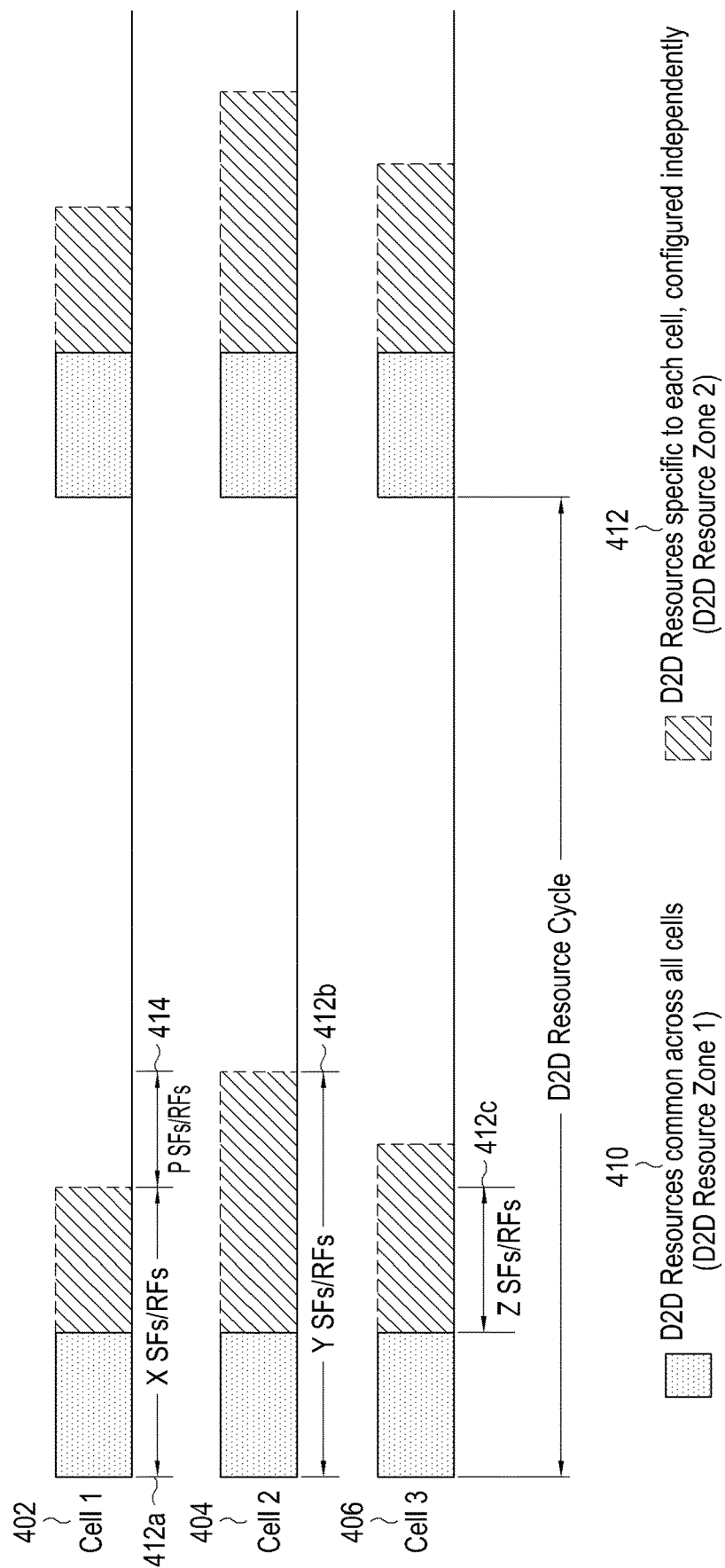

FIG. 4B is a diagram illustrating a signaling scheme for D2D transmission resources and D2D reception resources according to an embodiment of the present disclosure.

Referring to FIG. 4B, the cell 1 402 may broadcast information X 412*a* to indicate D2D transmission resources and a difference P 414 between D2D transmission resources and D2D reception resources. P 414 is a difference (or delta) between the length X 412*a* of D2D transmission resources and the length Y 412*b* of D2D reception resources, of the cell 1 402. If X>=P, P may be configured to be 0. An UE in the cell 1 402 may determine D2D reception resources as follows:

(D2D reception resources)=(D2D transmission resources)+P.

The cell 2 404 may broadcast information Y 412*b* about transmission resources and P=0, and the cell 3 406 may broadcast information Z 412*c* about D2D transmission resources and P=Y−Z.

In yet another embodiment of the present disclosure, the BS (i.e., the cell) may signal information about the length of its D2D resource zone 2. The BS may also signal information about the length of maximum-sized D2D resource zone 2, among itself and neighboring D2D resource zones.

FIG. 4C is a diagram illustrating a signaling scheme for D2D transmission resources and D2D reception resources according to an embodiment of the present disclosure.

Referring to FIG. 4C, the cell 1 402 may broadcast parameter X 416*a* that represents the length of its additional D2D transmission resources (that is a D2D resource zone 2) and parameter Y 416*b* that represents the length of the additional D2D transmission resources having the maximum size among them of neighboring cells. An UE in the cell 1 402 may determine D2D transmission resources and D2D reception resources as follows:

(D2D transmission resources)=X+the length of the D2D resource zone 1, (D2D reception resources)=Y+the length of the D2D resource zone 1.

The information about the length of the D2D resource zone 1 may be signaled in System Information Blocks (SIBs) from the BS, or may be configured by D2D Provisioning Function (DPF). DPF refers to a server in charge of D2D related communication in the Public Land Mobile Network (PLMN) to which the UE belongs.

The cell 2 404 may broadcast parameter Y 416*b*, and the cell 3 406 may broadcast parameter Z 416*c* and parameter Y 416*b*. In the case D2D transmission resources is comprised of type 1 and type 2 resources, the cell 1 402 may signal [X-(type 2 resources)] instead of x, as the information about D2D resource zone 1.

The cells 2 404 and 3 406 may signal in the same way.

In another embodiment of the present disclosure, the BS (i.e., the cell) may signal information about the length of additional D2D resources in the cell. The BS may signal the difference (delta) between the length of D2D resources in the cell and length of additional D2D resources in a cell which has configured the maximum additional D2D resources.

Figure 4D:
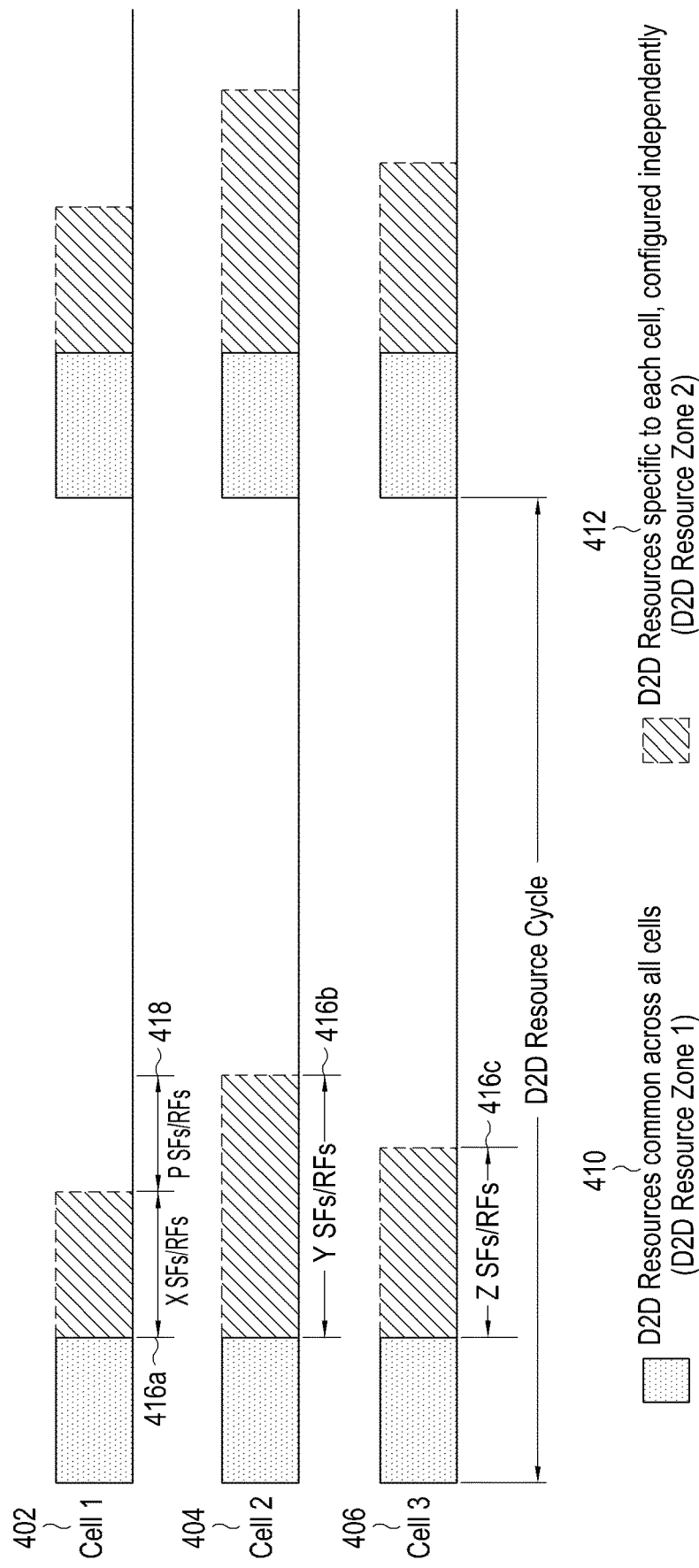

FIG. 4D is a diagram illustrating a signaling scheme for D2D transmission resources and D2D reception resources according to an embodiment of the present disclosure.

Referring to FIG. 4D, the cell 1 402 may broadcast parameter X 416*a* that represents the length of its D2D resource zone 2 and P 418 that represents a difference between the D2D resource zone 2 and the D2D resource zone 2 having the maximum size among them of neighboring cells. P 418 is a difference (or delta) between the length X 416*a* of the D2D resource zone 2 of the cell 1 402 and the length Y 416*b* of the D2D resource zone 2 of the cell 2 404. If X>=P, P may be configured to be 0. An UE in the cell 1 402 may determine D2D transmission resources and D2D reception resources as follows:

D2D transmission resources=X+length of D2D resources common across all the cells, D2D reception resources=X+P+length of D2D resources common across all the cells.

The information about the length of the D2D resources common across all the cells (that is a D2D resource zone 1) may be signaled in SIBs from the BS or configured by the DPF.

The cell 2 404 may broadcast Y 416*b* which is the length of the D2D resource zone 2 and P=0, and the cell 3 406 may broadcast Z 416*c* which is the length of the D2D resource zone 2 and P=Y−Z.

In another embodiment of the present disclosure, the BS (or the cell) may broadcast the following information instead of signaling information about the D2D transmission resources and D2D reception resources:

a) Information about additional D2D resources configured in the cell, e.g., the length of additional D2D resources in the cell, b) Information about additional D2D resources configured in neighboring cell(s), e.g., the length of additional D2D resources in the neighboring cell(s), and c) Information about D2D resources common across all the cells. In an embodiment of the present disclosure, the information may be configured in advance and known to the UE through the DPF.

In an embodiment of the present disclosure, a UE may determine D2D reception resources based on its location. In other words, the UE may determine the D2D reception resources using the information about D2D resources of the neighboring cells seen by UE. For example, the UE may recognize D2D resources of a cell that has configured the maximum-sized additional D2D resources among the serving cell and the neighboring cells detectable to the UE, and the recognized D2D resources may be D2D reception resources.

Figure 5:
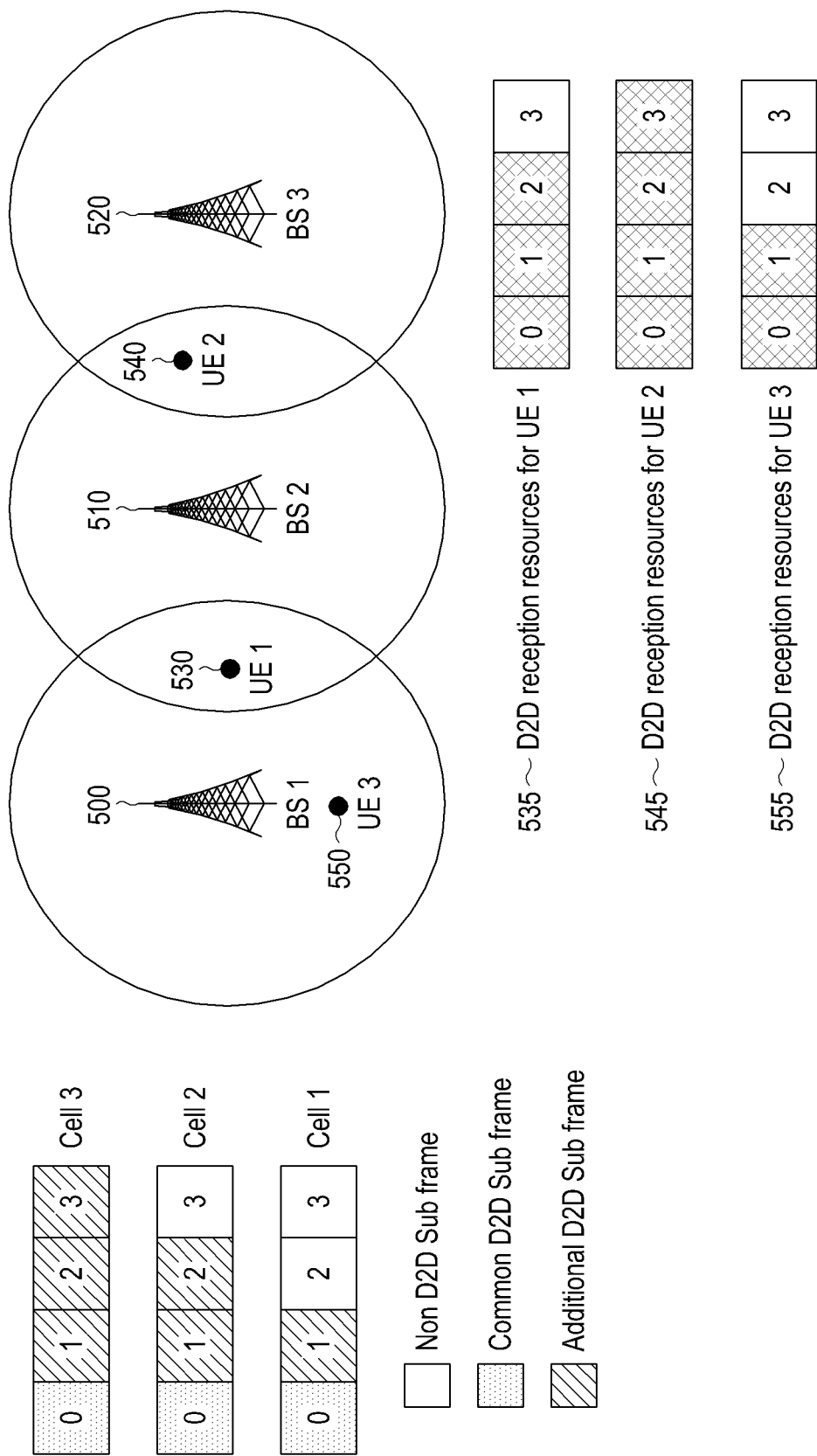
FIG. 5 is a diagram illustrating a determination of a D2D resource pool by a UE according to an embodiment of the present disclosure.

FIG. 5 is a diagram illustrating a determination of a D2D resource pool by a UE according to an embodiment of the present disclosure.

Referring to FIG. 5, a BS 1 500, a BS 2 510, and a BS 3 520 for serving a cell 1, a cell 2, and a cell 3, respectively, are shown. The UE 1 530 exists in an overlapping region of the BS 1 500 and the BS 2 510, and the UE 2 540 exists in an overlapping region of the BS 2 510 and the BS 3 520. The UE 3 550 is located closer to the BS 1 500. D2D resources common across all the cells, i.e., D2D resource zone 1 has subframe 0. D2D resource zone 2 for the cell 1 of the BS 1 500 has subframe 1, D2D resource zone 2 for the cell 2 of the BS 2 510 has subframes 1 and 2, and D2D resource zone 2 for the cell 3 of the BS 3 520 has subframes 1, 2, and 3.

The UE 1 530 may detect the BSs 1 and 2 500 and 510, respectively, and D2D reception resources 535 for the UE 1 530 may be determined using D2D resources of the BSs 1 and 2 500 and 510, respectively. In other words, D2D reception resources 535 of the UE 1 530 may be determined to be subframes 0, 1, and 2 that include all the D2D resources of the BSs 1 and 2 500 and 510, respectively.

Similarly, for the UE 2 540 that may detect the BSs 2 and 3 510 and 520, respectively, D2D reception resources 545 may be determined to be subframes 0, 1, 2 and 3 based on D2D resources of the BSs 2 and 3 510 and 520, respectively. Similarly, for the UE 3 550 that may detect the BS 1 500, D2D resource pool 2 555 may be determined to be subframes 0, 1 based on D2D resources of the BS 1 500.

In an embodiment of the present disclosure, for each neighbor cell detected by a UE, the UE receives information about D2D transmission resources configured in neighbor cell from the information broadcasted by neighbor cell.

In another embodiment of the present disclosure, the UE may be provided information from the serving cell about D2D transmission resources configured in each neighboring cells. The D2D reception resources used by the UE for receiving D2D signals transmitted by other D2D UE(s) on the same radio frequency as the radio frequency of the camped cell comprises of D2D transmission resources configured in each detected neighbor cell and D2D transmission resources configured in the camped cell. In an embodiment of the present disclosure, for D2D transmission resources, information about a type 1 and type 2 resource partition may be signaled from the cell. In an embodiment of the present disclosure, information about the duration of a cycle in which D2D resources are allocated, i.e., D2D resource cycle, and information about start of the D2D resource cycle may be signaled by each cell or configured in advance by the DPF.

In an embodiment of the present disclosure, for D2D transmission resources, information about at least one of non D2D subframes and non D2D resources may be signaled from the cell.

Non D2D subframes refer to subframes not used for D2D. Non D2D resources refer to a resource region not used for D2D, and may be represented in Physical Resource Blocks (PRBs). For optimization, the information may be signaled for D2D reception resources also.

In an embodiment of the present disclosure, the same staggered pattern of D2D and non D2D subframes may be used across all the cells in every D2D resource cycle.

The embodiments may be used for D2D direct discovery, in which case D2D resources become D2D discovery resources. The embodiments may be used for D2D communication, in which case D2D resources become D2D communication resources. The embodiments may also be used for D2D communication and discovery, in which case D2D resources become D2D communication and discovery resources.

In the following embodiments, each cell may configure D2D resources whenever required. In one embodiment of the present disclosure, the duration and start of the D2D resource cycle may be the same across all the cells.

Figure 6:
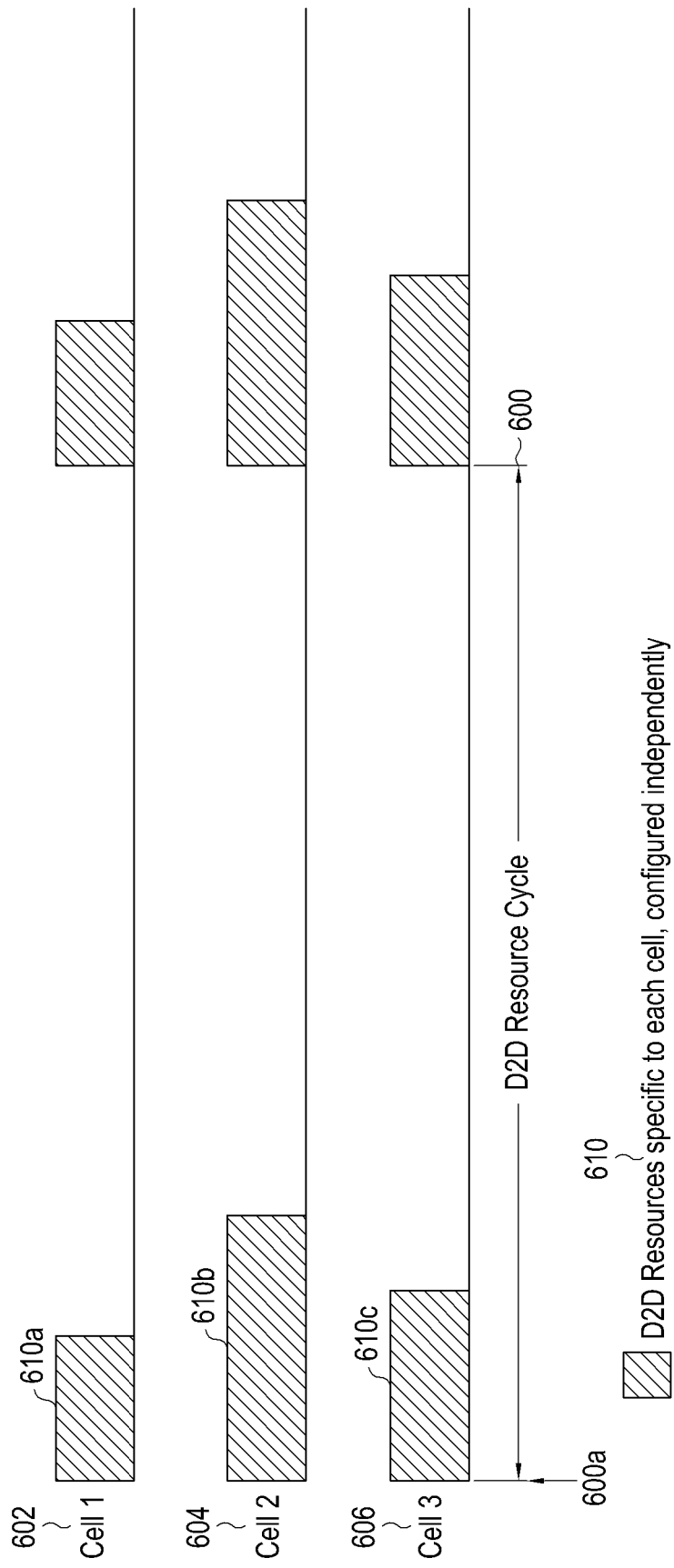
FIG. 6 illustrates a D2D resource configuration according to an embodiment of the present disclosure.

FIG. 6 illustrates a D2D resource configuration according to an embodiment of the present disclosure. While there are three cells 602, 604, and 606 in the system, it is obvious that the same resource configuration scheme is applicable to a case where there are more number of cells.

Referring to FIG. 6, a cell 1 602, a cell 2 604, and a cell 3 606 may have their respective D2D resources 610 (610a, 610b, and 610c) configured independently. The duration 600 and start 600a of a cycle in which the D2D resources 610 are allocated (hereinafter, referred to as a D2D resource cycle) is the same across all the cells 602, 604, and 606. In another embodiment of the present disclosure, the start 600a and/or the duration 600 of the D2D resource cycle may be different or configured independently per cell. The D2D resources may be allocated such that summations of D2D resources of the neighboring cells are consecutive. In other words, D2D resources allocated to the neighboring cells 602, 604, and 606 may be comprised of consecutive resource units and do not include an empty space or gap.

Each cell may interact with its neighboring cells and know about D2D resources configured by the neighboring cells. Each cell may obtain information about D2D resources configured by the neighboring cells using an X2 interface between BSs.

Each cell may broadcast the following information to assist the UE for inter cell D2D operation:

a) Information About D2D Transmission Resources

This is comprised of D2D resources configured for D2D transmissions by the cell. An UE camped to the cell uses D2D transmission resources broadcasted by the cell for D2D transmission. An UE camped to the cell uses the D2D transmission resources broadcasted by the camped cell for D2D transmission on same frequency as the frequency of the camped cell. The D2D transmission resources may be further divided into Type 1 and Type 2 D2D resources, wherein the Type 1 D2D resources are common D2D resources and Type 2 D2D resources are dedicated D2D resources. In a case the dedicated D2D resources are not allocated or the UE is in idle state, the UE may use type 1 D2D resources for D2D transmission. In an embodiment of the present disclosure, the D2D transmission resources broadcasted by a cell may be comprised of Type 1 D2D resources only or Type 2 D2D resources only.

b) Information About D2D Reception Resources.

This includes D2D resources configured for D2D transmissions in the cell and its neighbor cells. In one embodiment this includes D2D resources configured in the cell and its neighbor cells on the same radio frequency as the radio frequency of the cell. In an embodiment of the present disclosure, D2D reception resources comprises of D2D resources having the maximum size among D2D resources that has configured in the cell and neighboring cells. In another embodiment of the present disclosure, D2D reception resources may be comprised of all the D2D resources of the cell and the neighboring cells.

In one embodiment of the present disclosure, the D2D UE camped to a cell uses the D2D reception resources broadcasted by the cell for receiving D2D signals transmitted by other D2D UE(s). In another embodiment of the present disclosure, The D2D UE camped to a cell uses the D2D reception resources broadcasted by the camped cell for receiving D2D signals transmitted by other D2D UE(s) on the same radio frequency as the radio frequency of the camped cell. In an embodiment of the present disclosure, the D2D reception resources broadcasted by the serving cell comprises of Type 1 D2D resources and Type 2 D2D resources of the serving cell and neighbor cells.

Embodiments of signaling schemes for the D2D transmission resources and D2D reception resources will now be described.

In an embodiment of the present disclosure, the BS (i.e., the cell) may signal information about the length of its D2D resources. The length may be represented e.g., in the number of subframes or radio frames. The BS may also signal the length of D2D resources of a cell that has configured maximum D2D resources among itself and neighboring cells.

Figure 7A:
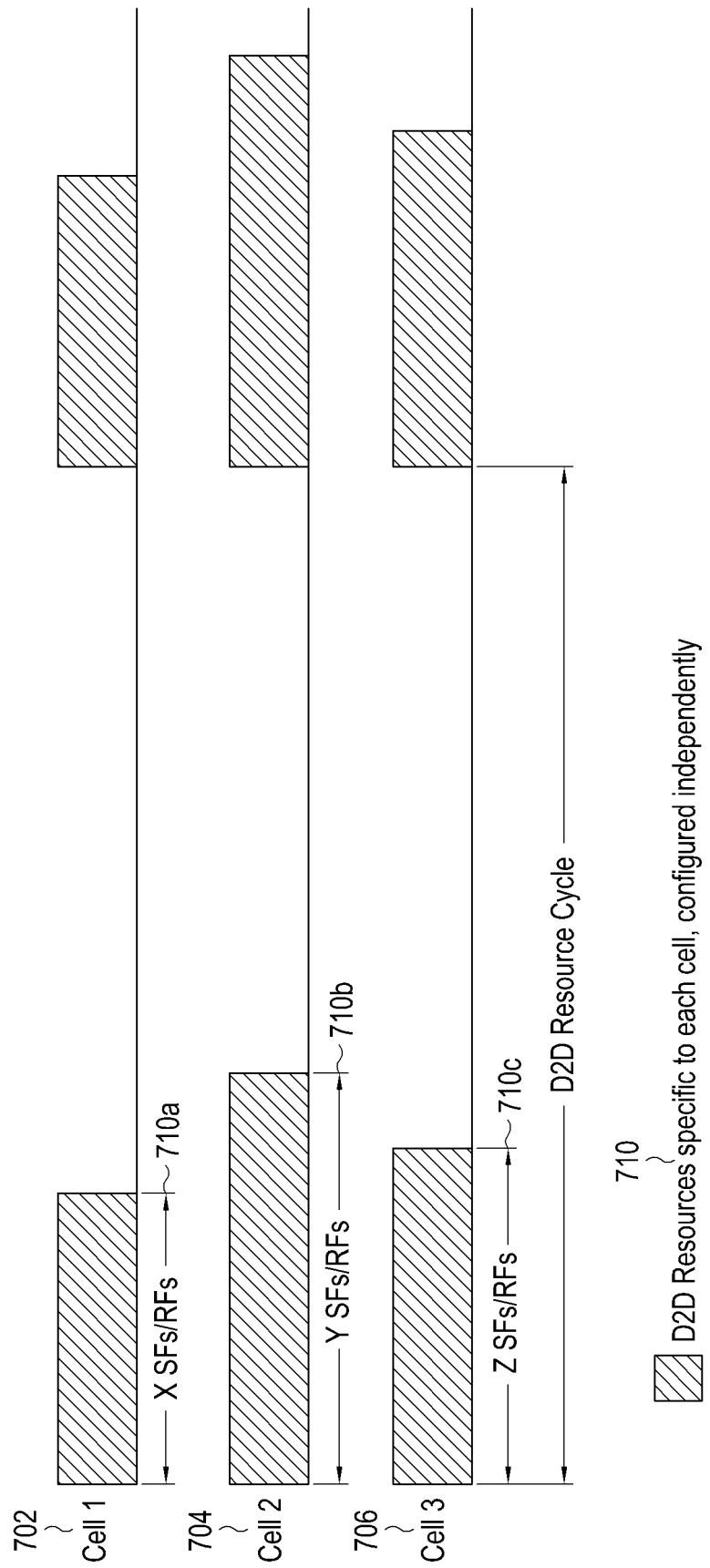
FIGS. 7A and 7B are diagrams illustrating signaling schemes for D2D resource pools according to embodiments of the present disclosure.

FIG. 7A is a diagram illustrating a signaling scheme for D2D resource pools according to an embodiment of the present disclosure.

Referring to FIG. 7A, a cell 1 702, a cell 2 704, and a cell 3 706 may have D2D resources 710 configured independently. The cell 1 702 may broadcast information X 710*a* about D2D transmission resources and information Y 710*b* about D2D reception resources. Since the cell 2 704 has the maximum-sized D2D resources, the D2D resources 710 of the cell 2 704 become the D2D reception resources of neighboring cells. The cell 2 704 may broadcast information Y 710*b* about the D2D transmission resources and D2D reception resources, and the cell 3 706 may broadcast information Z 710*c* about the D2D transmission resources and information Y 710*b* about the D2D reception resources.

In another embodiment of the present disclosure, the BS (i.e., the cell) may signal information about the length of its D2D resources 710. The BS may also signal a difference (delta) between D2D transmission resources and D2D reception resources.

Figure 7B:
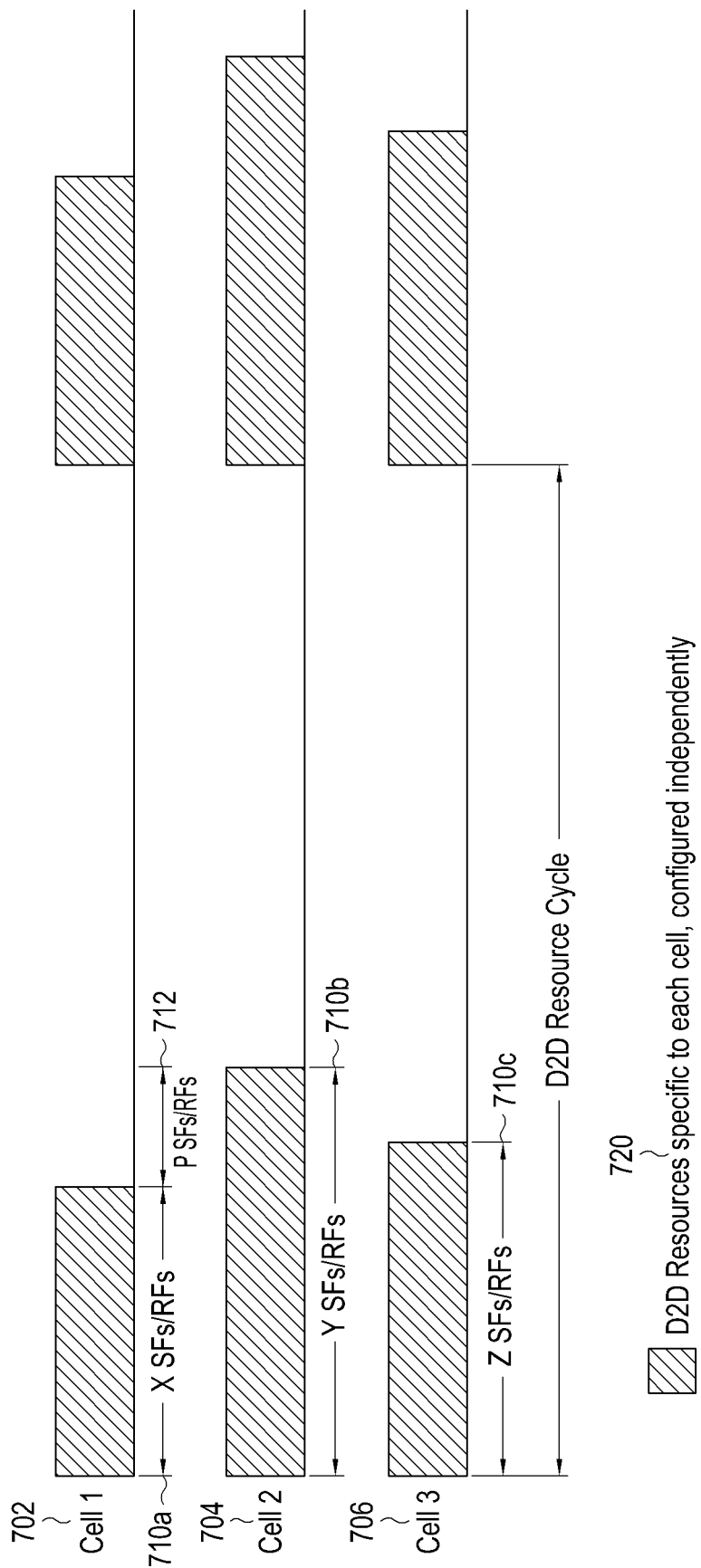

FIG. 7B is a diagram illustrating a signaling scheme for D2D transmission resources and D2D reception resources according to an embodiment of the present disclosure.

Referring to FIG. 7B, the cell 1 702 may broadcast information X 710*a* about D2D resources 720 and a difference P 712 between D2D transmission resources and D2D reception resources. P 712 is a difference (or delta) between the length X 710*a* of D2D transmission resources and the length Y 412*b* of D2D reception resources, of the cell 1 702. If X>=P, P may be configured to be 0. The UE in the cell 1 702 may determine the D2D reception resources as follows:

(D2D reception resources)=(D2D transmission resources)+P.

The cell 2 704 may broadcast information Y 710*b* about the D2D transmission resources and P=0, and the cell 3 706 may broadcast information Z 710*c* about the D2D transmission resources and P=Y−Z.

In another embodiment of the present disclosure, the BS (or the cell) may broadcast the following information instead of signaling information about the D2D transmission resources and D2D reception resources:

a) Information about D2D resources configured in the cell,
b) Information about D2D resources configured in each neighboring cell(s).

In an embodiment of the present disclosure, a UE may determine D2D reception resources based on its location. In other words, the UE may determine the D2D reception resources using the information about D2D resources of the neighboring cells seen or detected by UE. For example, the UE may recognize D2D resources of a cell that has configured the maximum-sized D2D resources among the serving cell and the neighboring cells detectable to the UE, and the recognized D2D resources may be D2D reception resources.

Figure 8:
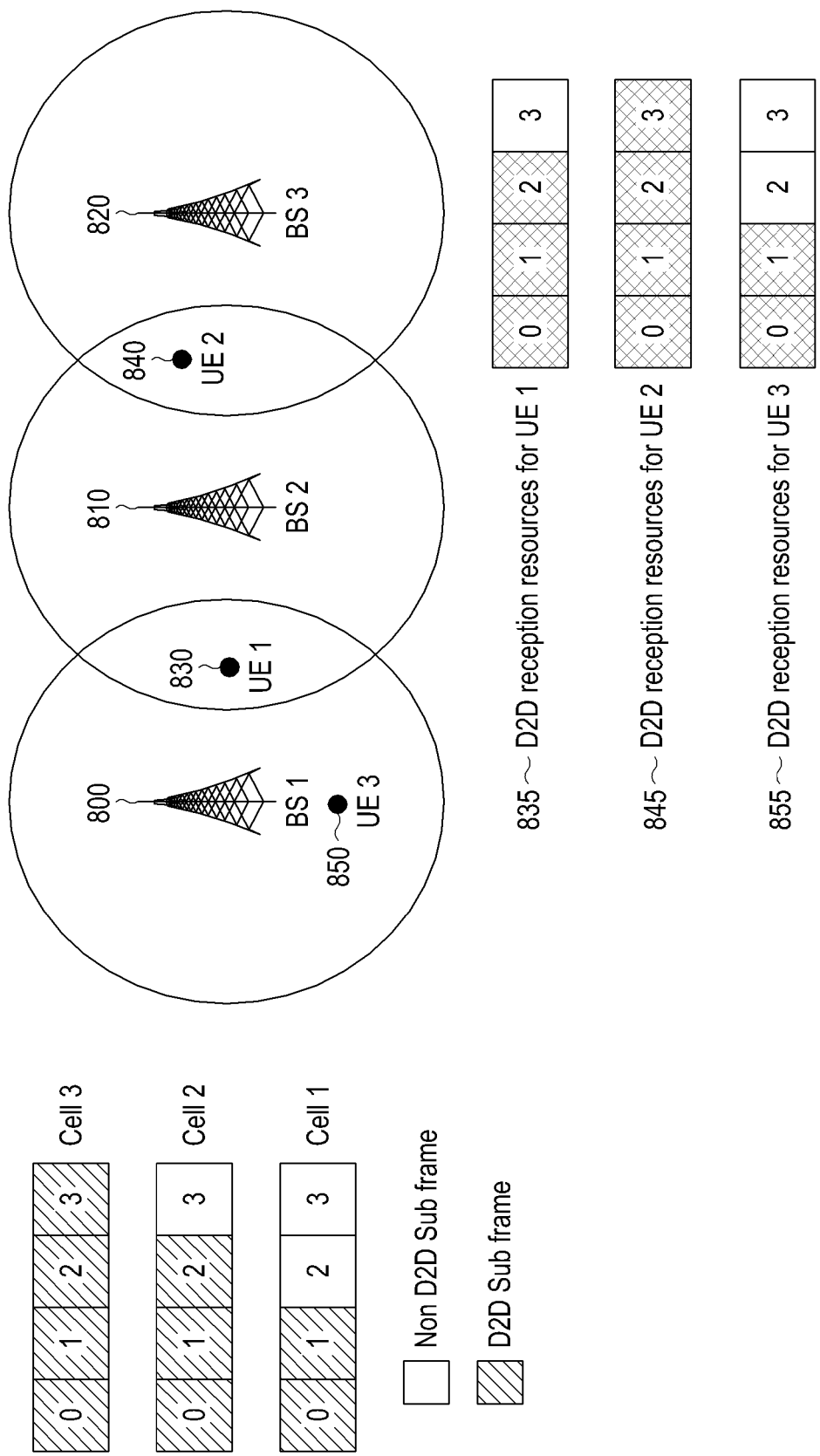
FIG. 8 is a diagram illustrating a determination of a D2D reception resources by a UE according to an embodiment of the present disclosure.

FIG. 8 is a diagram illustrating a determination of a D2D reception resources by a UE according to an embodiment of the present disclosure.

Referring to FIG. 8, a BS 1 800, a BS 2 810, and a BS 3 820 for serving a cell 1, a cell 2, and a cell 3, respectively, are shown. A UE 1 830 exists in an overlapping region of the BS 1 800 and the BS 2 810 and a UE 2 840 exists in an overlapping region of the BS 2 810 and the BS 3 820. A UE 3 850 is located closer to the BS 1 800. D2D resources for the cell 1 of the BS 1 800 has subframes 0, 1, D2D resources for the cell 2 of the BS 2 810 has subframes 0, 1, 2, and D2D resources for cell 3 of BS 3 820 has subframes 0, 1, 2, 3.

The UE 1 830 may detect the BSs 1 and 2 800 and 810, respectively, and D2D reception resources 835 for the UE 1 830 may be determined using D2D resources of the BSs 1 and 2 800 and 810, respectively. In other words, D2D reception resources 835 of the UE 1 830 may be determined to be subframes 0, 1, and 2 that include all the D2D resources of the BSs 1 and 2 800 and 810, respectively. Similarly, for the UE 2 840 that may detect the BSs 2 and 3 810 and 820, respectively, D2D reception resources 845 may be determined to be subframes 0, 1, 2 and 3 based on D2D resources of the BSs 2 and 3 810 and 820, respectively. Similarly, for the UE 3 850 that may detect the BS 1 800, D2D reception resources 855 may be determined to be subframes 0, 1 based on D2D resources of the BS 1 800.

In an embodiment of the present disclosure, for each neighbor cell detected by a UE, the UE receives D2D transmission resources configured in neighbor cell from the information broadcasted by neighbor cell. In another embodiment of the present disclosure, the UE may be provided information from the serving cell about D2D transmission resources configured in each neighboring cells. The D2D reception resources used by the UE for receiving D2D signals transmitted by other D2D UE(s) on the same radio frequency as the radio frequency of the camped cell comprises of D2D transmission resources configured in each detected neighbor cell and D2D transmission resources configured in the camped cell.

In an embodiment of the present disclosure, for D2D transmission resources, information about a type 1 and type 2 resource partition may be signaled from the cell. In an embodiment of the present disclosure, information about the duration of a cycle in which D2D resources are allocated, i.e., D2D resource cycle, and information about start of the D2D resource cycle may be signaled by each cell or configured in advance by the DPF.

In an embodiment of the present disclosure, for D2D transmission resources, information about at least one of non D2D subframes and non D2D resources may be signaled from the cell.

Non D2D subframes refer to subframes not used for D2D, and non D2D resources refer to a resource region not used for D2D, i.e., PRBs. For optimization, the information may also be signaled for D2D reception resources.

In an embodiment of the present disclosure, the same staggered pattern of D2D and non D2D subframes may be used across all the cells in every D2D resource cycle.

The embodiments may be used for D2D direct discovery, in which case D2D resources become D2D discovery resources. The embodiments may be used for D2D communication, in which case D2D resources become D2D communication resources. The embodiments may also be used for D2D communication and discovery, in which case D2D resources become D2D communication and discovery resources.

Operations for inter cell D2D reception of a UE in connected state will now be described.

The UE may try to receive D2D transmissions from other UE(s) while in Radio Resource Control (RRC) connected state in which the UE is able to communicate with a BS. If D2D resources and resources for communication with the BS are in the same subframes, the UE is unable to perform transmission to the BS and D2D reception from other UEs at the same time in the same subframes. To receive D2D signals from other UE(s) in the neighboring cell, the UE may require some gaps. In other words, while the UE is receiving D2D signals from the neighboring cells, the BS may not schedule uplink transmissions.

In an embodiment of the present disclosure, the UE may transmit a signaling message to the BS of the serving cell to indicate that it wants to perform D2D reception. In an embodiment of the present disclosure, the UE may report the information when D2D transmission resources is not the same as D2D reception resources. In an embodiment of the present disclosure, the UE may report the information when additional D2D subframes rather than what are configured in the serving cell are to be monitored. The additional D2D subframes to be monitored may be determined based on D2D resource information in the neighboring cells. In an embodiment of the present disclosure, if the UE has no capability to communicate with a BS while monitoring D2D resources, e.g., especially discovery resources, of the neighboring cells, i.e., if the UE does not have separate receive chains for D2D and BS communication, the UE may report the information.

Based on the report from the UE, the BS may not schedule uplink transmissions, e.g., a Physical Uplink Shared Channel (PUSCH) for the UE in particular subframes. In an embodiment of the present disclosure, the BS may not schedule (or blank) uplink transmissions for the UE in the D2D subframes in the D2D reception resources.

Figure 9:
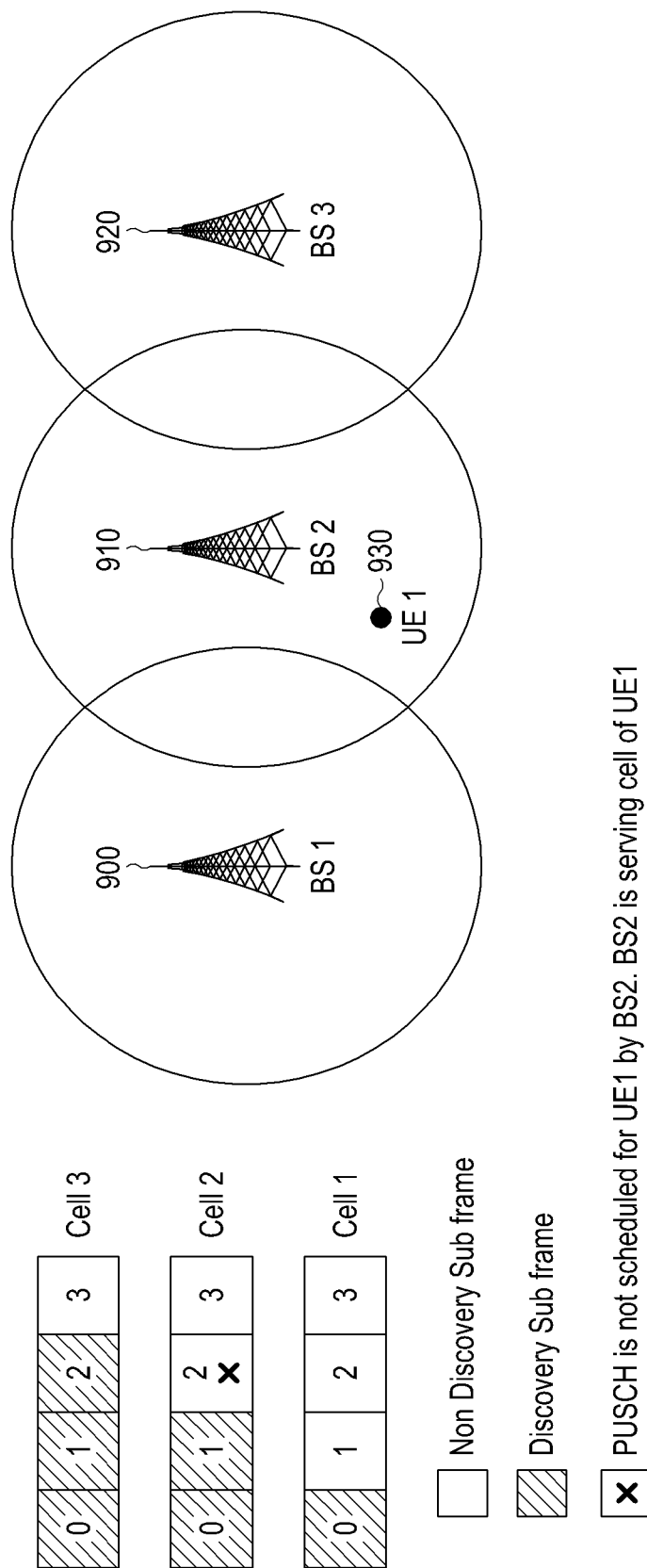
FIG. 9 is a diagram illustrating a blanking of uplink transmission based on a report from a UE according to an embodiment of the present disclosure.

FIG. 9 is a diagram illustrating a blanking of uplink transmission based on a report from a UE according to an embodiment of the present disclosure.

Referring to FIG. 9, a BS 1 900, a BS 2 910, and a BS 3 920 for serving a cell 1, a cell 2, and a cell 3, respectively, are shown with a UE 1 930 located in the cell 2 of the BS 2 910. D2D resources for the cell 1 of the BS 1 900 has subframe 0, D2D resources for the cell 2 of the BS 2 910 has subframes 0, 1 and D2D resources for the cell 3 of the BS 3 920 has subframes 0, 1, 2. For the UE 1 930, D2D transmission resources has subframes 0, 1, and D2D reception resources has subframes 0, 1, 2. The UE 1 930 may report to the BS 2 910 of information indicating that D2D receiving operation is to be performed in subframe 2 based on the D2D resource information obtained from the cells 1 and 3, and accordingly, the BS 2 910 may not schedule uplink transmissions for the UE 1 930 in subframe 2. For example, subframe 2 is blanked.

In an embodiment of the present disclosure, some subframes in the D2D reception resources may be scheduled for uplink transmissions for handling ongoing hybrid automatic repeat request (HARQ) transmissions and/or HARQ transmissions for traffic susceptible to latency or traffic with higher priority over D2D reception. The BS may signal the UE information about subframes scheduled for uplink transmission in D2D reception resources or subframes not scheduled for uplink transmission in the D2D reception resources.

In another embodiment of the present disclosure, the BS may determine subframes to be blanked for the UE, which correspond to D2D resources of the neighboring cells detectable to the UE. The UE may report signal strengths of the neighboring cells to support the determination of the BS.

Figure 10A:
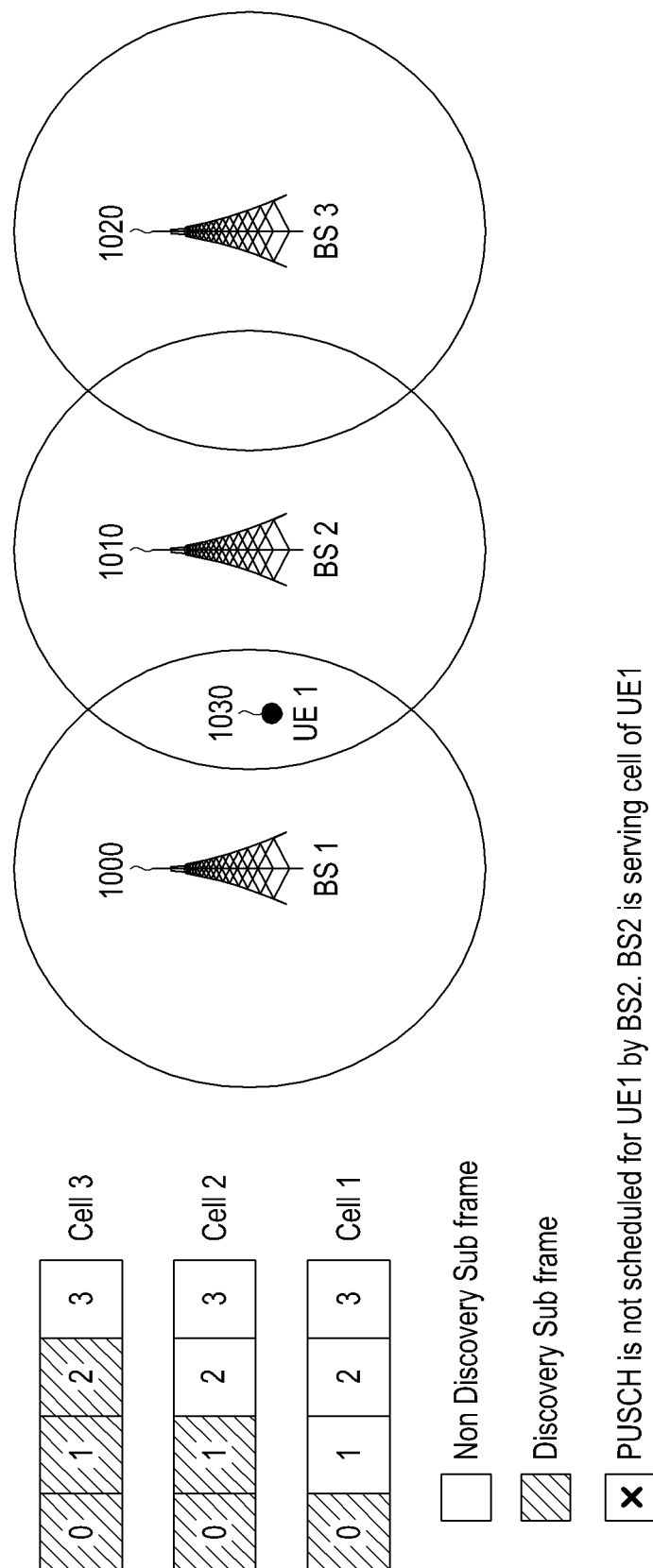
FIGS. 10A and 10B are diagrams illustrating a blanking of uplink transmission based on a location of a UE according to an embodiment of the present disclosure.
Figure 10B:
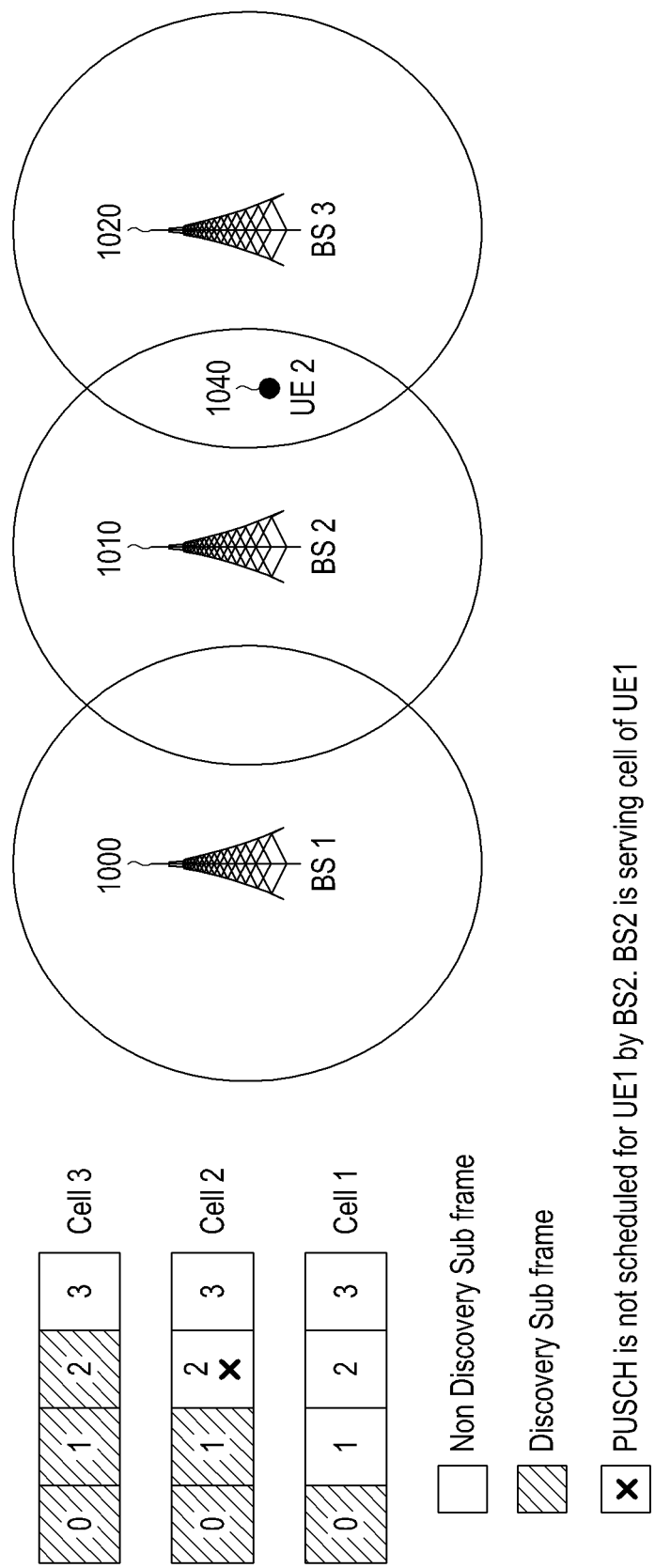

FIGS. 10A and 10B are diagrams illustrating a blanking of uplink transmission based on a location of a UE according to an embodiment of the present disclosure.

Referring to FIG. 10A, a BS 1 1000, a BS 2 1010, and a BS 3 1020 for serving a cell 1, a cell 2, and a cell 3, respectively, are shown with a UE 1 1030 located in an overlapping region of the BS 1 1000 and the BS 2 1010. D2D resources for the cell 1 of the BS 1 1000 has subframe 0, D2D resources for the cell 2 of the BS 2 1010 has subframes 0, 1 and D2D resources for the cell 3 of the BS 3 1020 has subframes 0, 1, 2. Since the cell 2 of the BS 2 1010 is a serving cell of the UE 1 1030, and the cell 1 of the BS 1 1000, which is a neighboring cell of the UE 1 1030, has D2D resources having smaller size than that of the cell 2, the BS 2 1010 may allocate non-D2D subframes, all of the subframes 2, 3, for uplink transmission of the UE 1 1030.

Referring to FIG. 10B, the BS 1 1000, the BS 2 1010, and the BS 3 1020 for serving a cell 1, a cell 2, and a cell 3, respectively, are shown with a UE 2 1040 located in an overlapping region of the BS 1 1000 and the BS 3 1020. D2D resources for the cell 1 of the BS 1 1000 has subframe 0, D2D resources for the cell 2 of the BS 2 1010 has subframes 0, 1 and D2D resources for the cell 3 of the BS 3 1020 has subframes 0, 1, 2. Since the cell 2 of the BS 2 1010 is a serving cell of the UE 2 1040, and the cell 3 of the BS 3 1020, which is a neighboring cell of the UE 2 1040, has D2D resources having larger size than that of the cell 2, the BS 2 1010 may not allocate the subframe 2 that corresponds to the D2D resource of the cell 3, among the non-D2D subframes, the subframes 2, 3, for uplink transmission of the UE 2 1040. For example, the subframe 2 is blanked.

In an embodiment of the present disclosure, some subframes among subframes determined to be blanked based on the location of the UE may be scheduled for uplink transmissions for handling ongoing HARQ transmissions and/or HARQ transmissions for traffic susceptible to latency or traffic with higher priority over D2D reception. The BS may signal the UE information about one or more subframes not scheduled for uplink transmission.

In another embodiment of the present disclosure, the UE may determine subframes that correspond to D2D resources of the neighboring cells detectable to the UE. The UE may report the BS of information about the determined subframes. The BS may determine some of the subframes reported by the UE not to be scheduled for uplink transmission based on the location of the UE. The reported subframes may be scheduled for uplink transmission for ongoing HARQ transmissions or HARQ transmissions for traffic susceptible to latency and traffic with higher priority over D2D reception. The BS may signal the UE information about subframes not scheduled for uplink transmission among the reported subframes.

The BS may not schedule the subframes that correspond to D2D resources of the neighboring cells for any PUSCH transmission. Accordingly, the UE may be able to monitor D2D subframes even while communicating with the BS, and any signaling may not be required between the UE and the BS.

Even if uplink data transmission is blanked according to various embodiments of the present disclosure, UE may not perform D2D reception in subframes scheduled for transmission of uplink control signals. The uplink control signals refer to e.g., Physical Uplink Control Channel (PUCCH). In an embodiment of the present disclosure, priorities among transmission of the uplink control signal and D2D reception may be determined. Priority of UE-BS traffic related to PUCCH transmission may be compared to the priority of D2D transmission by a D2D UE in the neighboring cell. For example, transmission of the uplink control signal may have priority over D2D discovery reception. In another example, D2D reception for public safety communication may have priority over transmission of the uplink control signal related to lower prioritized UE-BS transmission.

Figure 11A:
FIG. 11A is a flowchart of starting D2D resource monitoring according to an embodiment of the present disclosure.

FIG. 11A is a flowchart of starting D2D resource monitoring according to an embodiment of the present disclosure.

Referring to FIG. 11A, in operation 1105, a UE 1100 transmits a start D2D resource monitoring message indicating the start of D2D resource monitoring to a BS 1102 if a certain condition is met. The start D2D resource monitoring message may include information about when to start D2D resource monitoring, e.g., information about a subframe. The certain condition may include one or more of the following conditions:

UE is in RRC connected state with BS or with active Wide Area Network (WAN) communication, UE does not have a capability to communicate with BS while monitoring D2D resources. In other words, separate RX chains for D2D and BS communication are not equipped in the UE, D2D resources and resources for BS communication may be configured in the same subframes.

Upon reception of the start D2D resource monitoring message, BS may schedule resources for uplink WAN transmission (i.e., transmission from UE to BS) for the UE in subframes other than subframes in which D2D resources are configured in the neighboring cells and/or camped cell if possible.

UE may monitor configured D2D resources, i.e., discovery resources, in the subframes in which resources for WAN communication are not scheduled.

Figure 11B:
FIG. 11B is a flowchart of terminating D2D resource monitoring according to an embodiment of the present disclosure.

FIG. 11B is a flowchart of terminating D2D resource monitoring according to an embodiment of the present disclosure.

Referring to FIG. 11B, in operation 1110, if the UE 1100 is in RRC connected state or in RRC connected state with active WAN communication, and is monitoring D2D resources of the neighboring cells and/or camped cell after transmitting the start D2D resource monitoring message, the UE 1100 transmits to the BS 1102 a stop D2D resource monitoring message indicating to stop monitoring D2D signals, e.g., discovery messages transmitted from other UEs. The stop D2D resource monitoring message may include information about when to stop D2D resource monitoring, e.g., information about a subframe.

UE may handover to another BS while monitoring the discovery resources. When UE handovers from a source BS to a target BS, the target BS needs to be aware that the UE is monitoring the discovery resources.

Figure 11C:
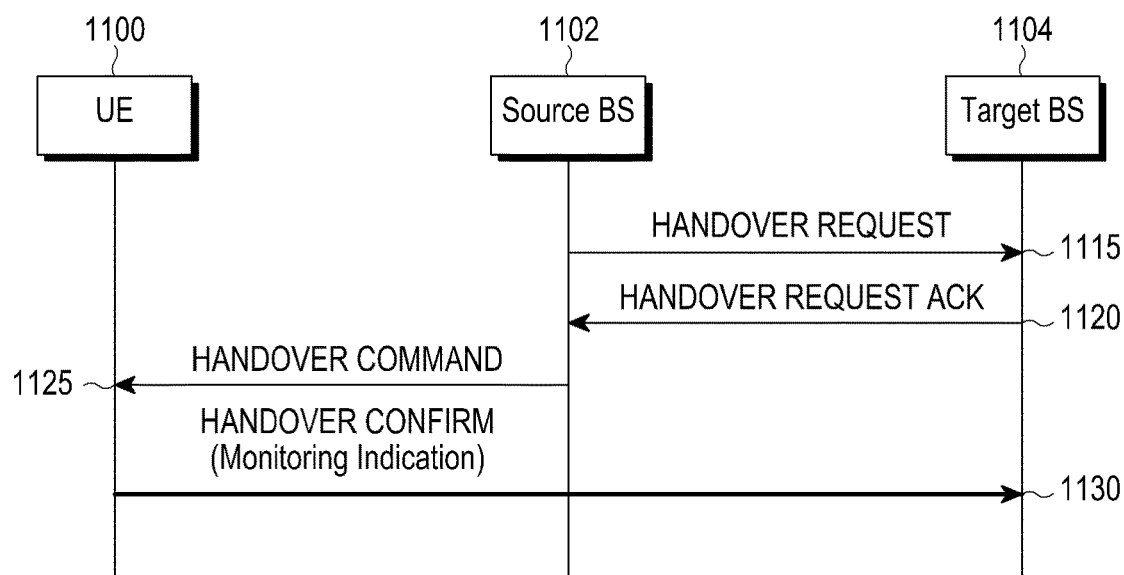
FIGS. 11C, 11D, and 11E are flowcharts illustrating a handover procedure during D2D monitoring according to embodiments of the present disclosure.

FIG. 11C is a flowchart illustrating a handover procedure during D2D monitoring according to an embodiment of the present disclosure.

Referring to FIG. 11C, in operation 1115, the source BS 1102 transmits to a target BS 1104 a handover request message for the UE 1100 that is monitoring D2D resources. In operation 1120, the target BS 1104 transmits the source BS 1102 a handover request acknowledgment (ACK) message. In operation 1125, the source BS 1102 transmits to the UE 1100 a handover command message. In operation 1130, the UE 1100 transmits a handover confirm message to the target BS 1104 indicated by the handover command message, and transmits monitoring indication in the handover confirm message for indicating that the UE 1100 is monitoring D2D resources, e.g., D2D discovery resources. The target BS 1104 may determine resources to be blanked for the UE 1100 in response to the monitoring indication.

Figure 11D:
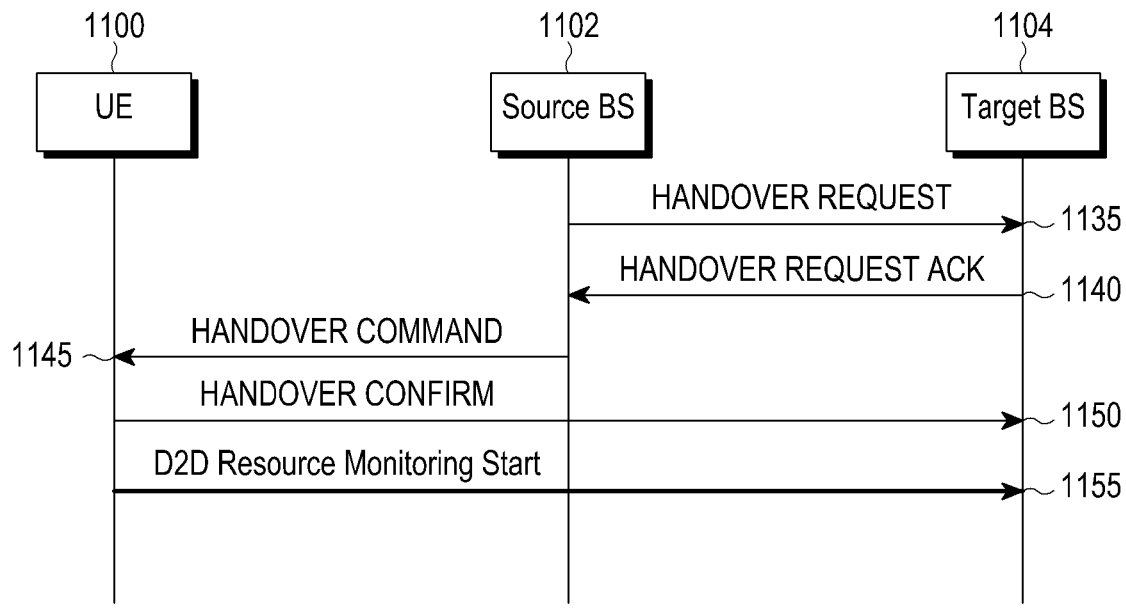

FIG. 11D is a flowchart illustrating a handover procedure during D2D monitoring according to an embodiment of the present disclosure.

Referring to FIG. 11D, in operation 1135, the source BS 1102 transmits to the target BS 1104 a handover request message for the UE 1100 that is monitoring D2D resources. In operation 1140, the target BS 1104 transmits to the source BS 1102 a handover request ACK message. In operation 1145, the source BS 1102 transmits to the UE 1100 a handover command message. In operation 1150, the UE 1100 transmits a handover confirm message to the target BS 1104, and informs the target BS 1104 that the UE 1100 is monitoring D2D resources, e.g., D2D discovery resources by transmitting start D2D resource monitoring message to the target BS 1104 in operation 1155. The target BS 1104 may determine resources to be blanked for the UE 1100 in response to the start D2D resource monitoring message.

Figure 11E:
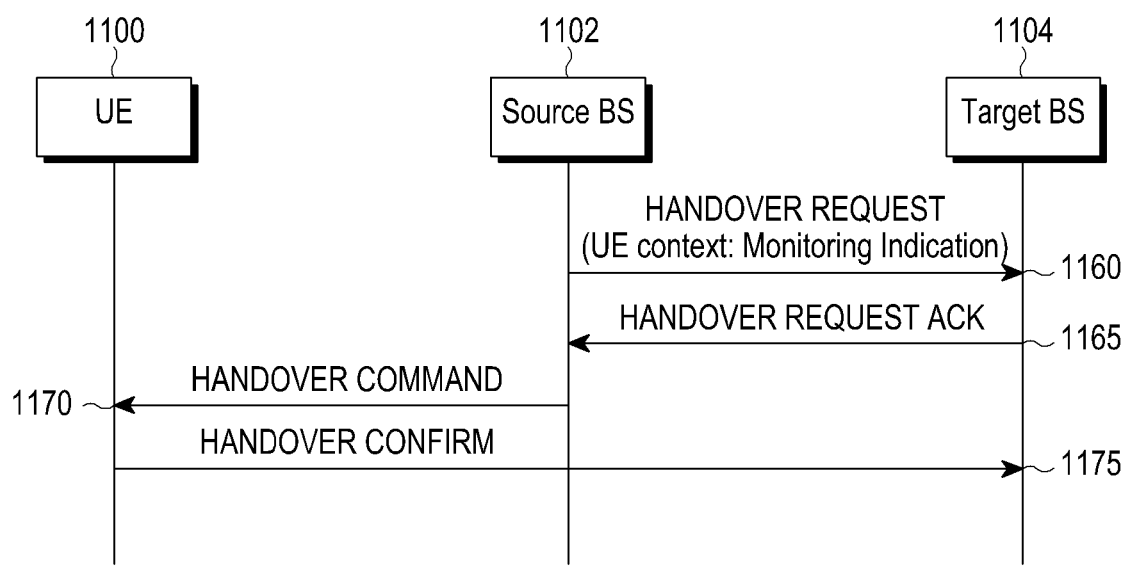

FIG. 11E is a flowchart illustrating a handover procedure during D2D monitoring according to an embodiment of the present disclosure.

Referring to FIG. 11E, in operation 1160, the source BS 1102 transmits to the target BS 1104 a handover request message for the UE 1100 that is monitoring D2D resources. A UE context in the handover request message may include monitoring indication for indicating that the UE 1100 is monitoring D2D resources, e.g., D2D discovery resources. In operation 1165, the target BS 1104 transmits to the source BS 1102 a handover request ACK message. In operation 1170, the source BS 1102 transmits to the UE 1100 a handover command message. In operation 1175, the UE 1100 transmits to the target BS 1104 a handover confirm message. The target BS 1104 may determine resources to be blanked for the UE 1100 in response to the monitoring indication in the UE context.

If D2D resources in neighboring cells are not equal, interference with transmission between UE and BS and D2D transmission may occur. For example, transmission from UE to BS in a cell, i.e., cellular uplink transmission may be interfered by D2D transmission of another cell. In another example, D2D transmission in a cell may be interfered by transmission from UE to BS in another cell. In yet another example, D2D reception from UE in a neighboring cell may be interfered by transmission from another UE to BS in the same cell.

Figure 12:
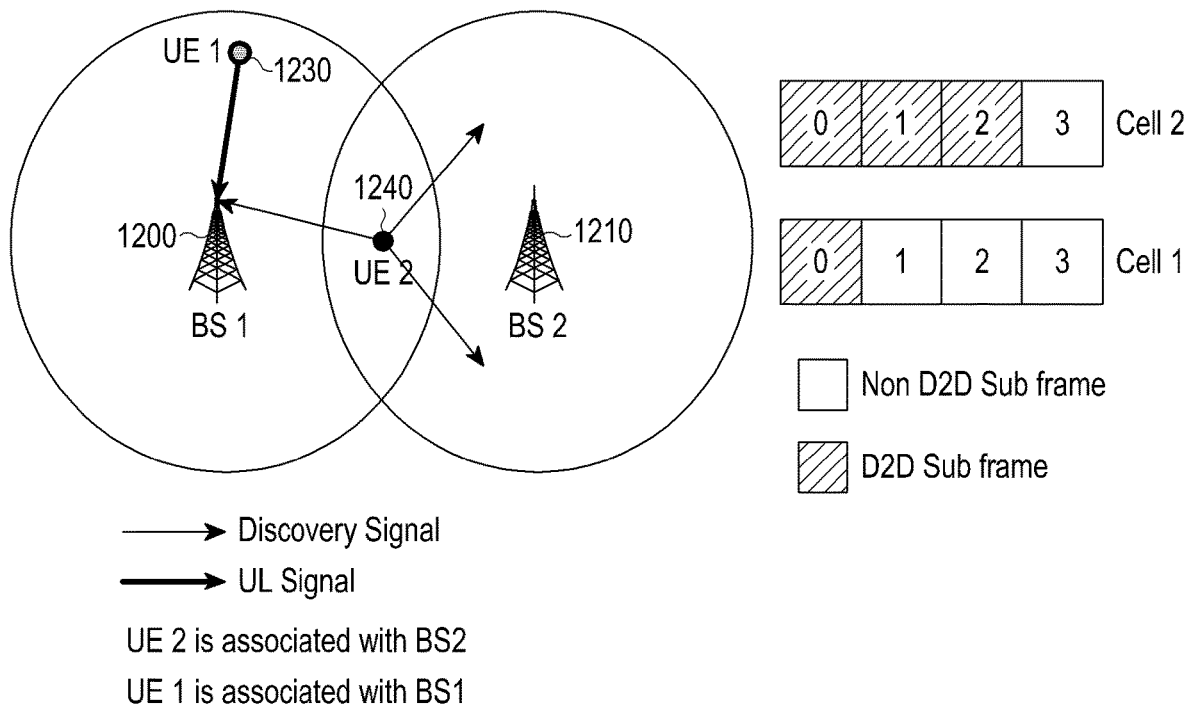
FIG. 12 illustrates interference by a D2D transmission in another cell according to an embodiment of the present disclosure.

FIG. 12 illustrates interference by a D2D transmission in another cell according to an embodiment of the present disclosure.

Referring to FIG. 12, a BS 1 1200 and a BS 2 1210 for serving a cell 1 and a cell 2, respectively, are shown. A UE 1 1230 is located in the cell 1 of the BS 1 1200, and a UE 2 1240 is located in an overlapping region of the BS 1 1200 and the BS 2 1210. D2D resources of the cell 1 correspond to subframe 0, and D2D resources of the cell 2 correspond to subframes 0, 1, 2. The UE 2 1240 that belongs to the BS 2 1210 is transmitting discovery signals in D2D resources, the subframes 0, 1, 2. D2D transmission in the subframes 1 and 2 by the UE 2 1240 in the cell 2 may interfere with transmission from the UE 1 1230 to the BS 1 1200 in the cell 1.

Figure 13:
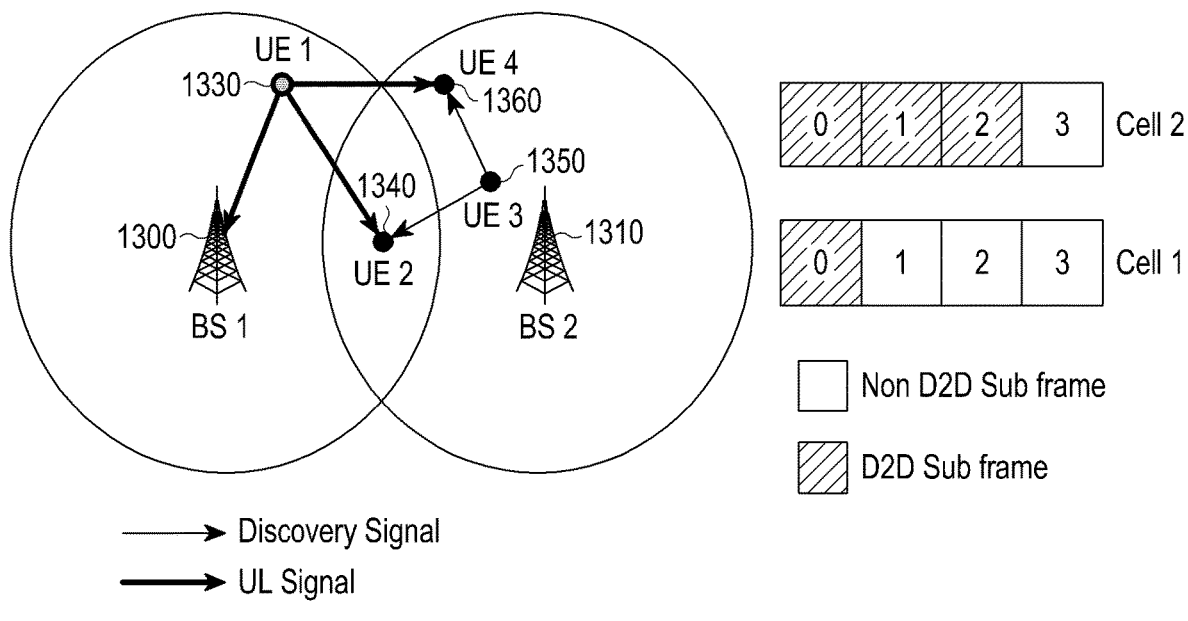
FIG. 13 illustrates interference by a UE-base station (BS) transmission in another cell according to an embodiment of the present disclosure.

FIG. 13 illustrates interference by a UE-BS transmission in another cell according to an embodiment of the present disclosure.

Referring to FIG. 13, a BS 1 1300 and a BS 2 1310 for serving a cell 1 and a cell 2, respectively, are shown. A UE 1 1330 is located in the cell 1 of the BS 1 1300, a UE 2 1340 is located in an overlapping region of the BS 1 1300 and the BS 2 1310, and UEs 3 and 4 1350 and 1360, respectively, are located in the cell 2 of the BS 2 1310. D2D resources of the cell 1 correspond to subframe 0, and D2D resources of the cell 2 correspond to subframes 0, 1, 2. The UE 2 1350 that belongs to the BS 2 1310 is transmitting discovery signals in D2D resources, subframes 0, 1, 2. D2D transmission in the subframes 1 and 2 by the UE 3 1350 in the cell 2 may be interfered by transmission from the UE 1 1330 to the BS 1 1300 in the cell 1. Such interference may affect reception of discovery signals by the UEs 2 and 4 1340 and 1360, respectively.

Figure 14:
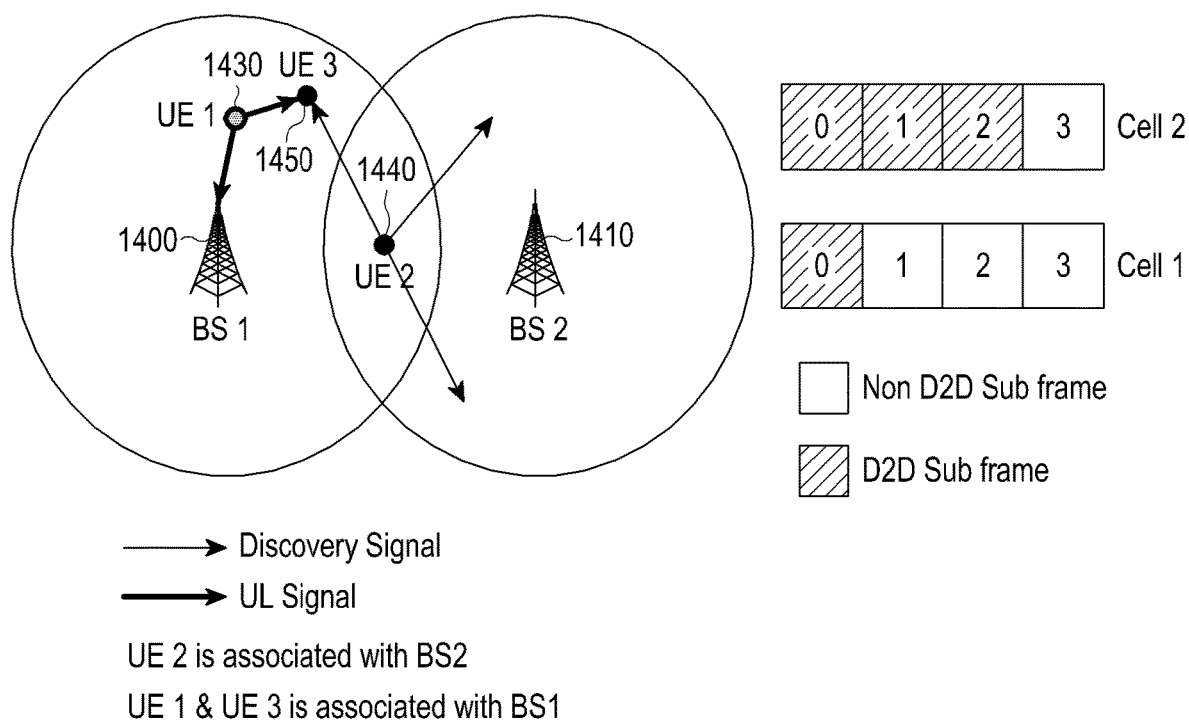
FIG. 14 illustrates interference by a UE-BS transmission in a same cell according to an embodiment of the present disclosure.

FIG. 14 illustrates interference by a UE-BS transmission in a same cell according to an embodiment of the present disclosure.

Referring to FIG. 14, a BS 1 1400 and a BS 2 1410 for serving a cell 1 and a cell 2, respectively, are shown. A UE 1 1430 and a UE 3 1450 are located in the cell 1 of the BS 1 1400, and a UE 2 1440 is located in an overlapping region of the BS 1 1400 and the BS 2 1410. D2D resources of the cell 1 correspond to subframe 0, and D2D resources of the cell 2 correspond to subframes 0, 1, 2. The UE 2 1440 that belongs to the BS 2 1410 is transmitting discovery signals in D2D resources, subframes 0, 1, 2. Reception of the discovery signals in the subframes 1 and 2 by the UE 3 1450 in the cell 1 may be interfered by transmission from the UE 1 1430 to the BS 1 1400.

In an embodiment for handling interference, a BS of a cell may blank non-D2D subframe(s) that correspond to D2D resources in neighboring cell(s). In an embodiment of the present disclosure, blanking denotes that uplink data transmission is not to be scheduled. In another embodiment of the present disclosure, blanking denotes that all transmissions (of data and control signals) from UE are not to be scheduled. A BS may determine non-D2D subframe(s) to be blanked based on information about D2D resource configuration received from the neighboring cells. The information about D2D resource configuration may be exchanged using an X2 interface between BSs.

Figure 15A:
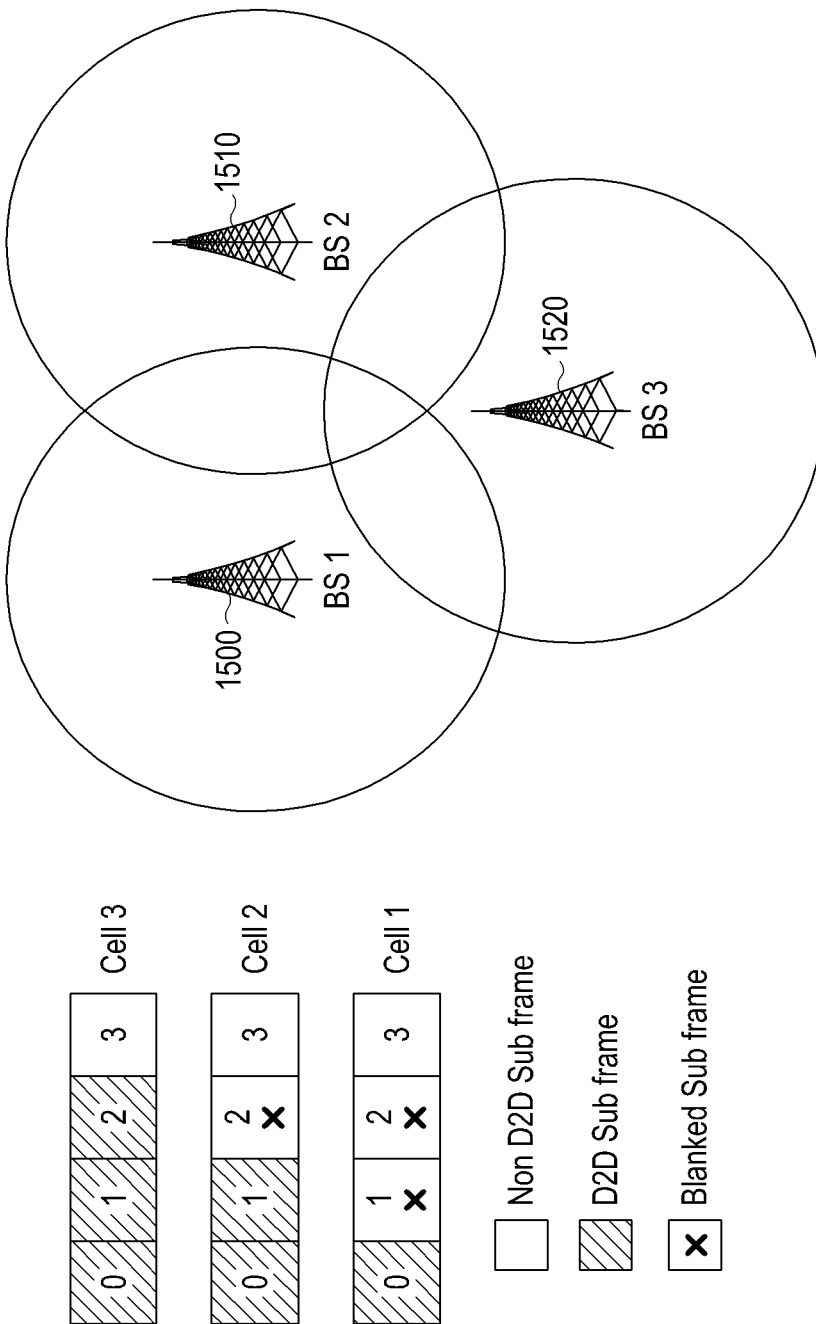
FIGS. 15A and 15B are diagrams illustrating interference handling according to an embodiment of the present disclosure.
Figure 15B:
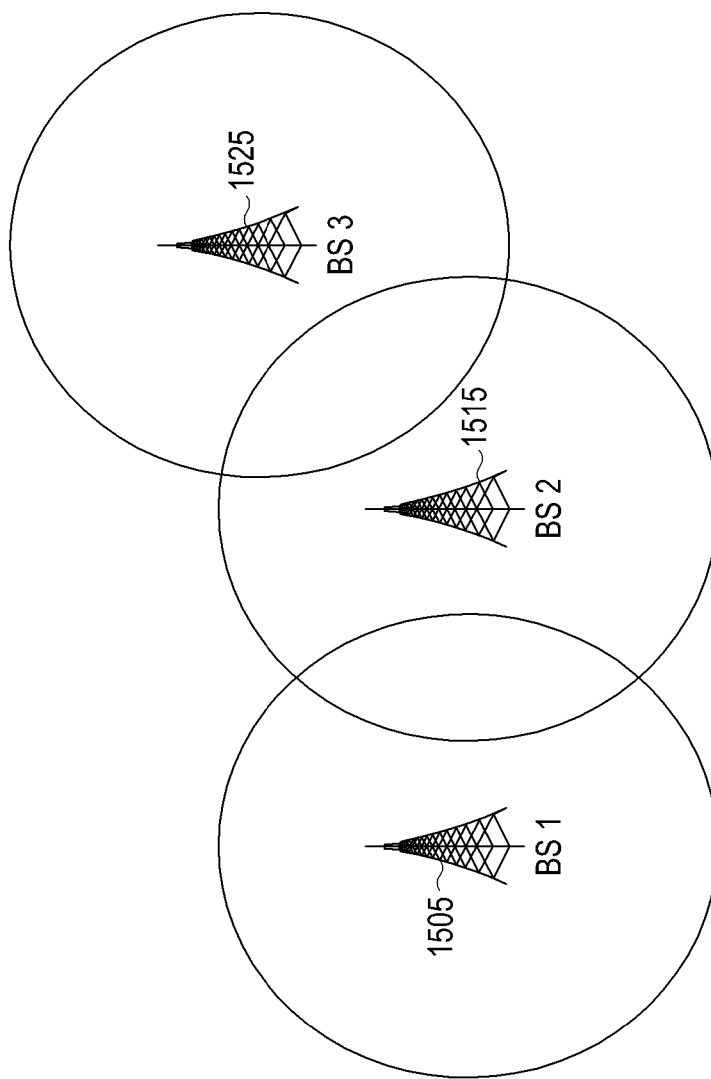
Figure 15B:
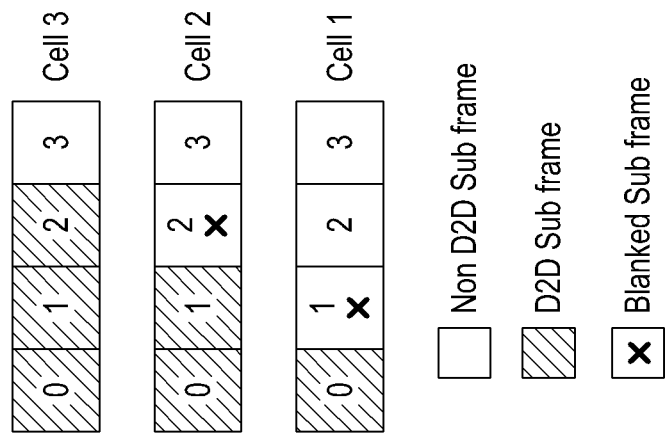

FIGS. 15A and 15B are diagrams illustrating interference handling according to an embodiment of the present disclosure.

Referring to FIG. 15A, a BS 1 1500, a BS 2 1510, and a BS 3 1520 for serving a cell 1, a cell 2, and a cell 3, respectively, are shown. D2D resources of the cell 1 of the BS 1 1500 correspond to subframe 0, D2D resources of the cell 2 of the BS 2 1510 correspond to subframes 0, 1, and D2D resources of the cell 3 of the BS 3 1520 correspond to subframes 0, 1, 2.

The cell 2 has the cell 1 and the cell 3 as its neighbors. The subframe 2 is a non-D2D subframe in the cell 2 while it is a D2D subframe in the neighboring cell 3. Accordingly, the BS 2 1510 of the cell 2 may blank subframe 2 and leave out subframe 2 from uplink transmission scheduling. The cell 1 has the cell 2 and the cell 3 as its neighbors. The subframes 1 and 2 are non-D2D subframes in the cell 1 while the subframe 1 is a D2D subframe in the neighboring cells 2 and 3 and the subframe 2 is a D2D subframe in the neighboring cell 2. Accordingly, the BS 1 1500 of the cell 1 may blank the subframes 1 and 2.

Referring to FIG. 15B, a BS 1 1505, a BS 2 1515, and a BS 3 1525 for serving a cell 1, a cell 2, and a cell 3, respectively, are shown. D2D resources of the cell 1 of the BS 1 1505 correspond to subframe 0, D2D resources of the cell 2 of the BS 2 1515 correspond to subframes 0, 1, and D2D resources of the cell 3 of the BS 3 1525 correspond to subframes 0, 1, 2.

The cell 2 has the cell 1 and the cell 3 as its neighbors. The subframe 2 is a non-D2D subframe in the cell 2 while it is a D2D subframe in the neighboring cell 3. Accordingly, the BS 2 1515 of the cell 2 may blank the subframe 2. The cell 1 has the cell 2 as its neighbor. The subframe 1 is a non-D2D subframe in the cell 1 while it is a D2D subframe in the neighboring cell 2. Accordingly, the BS 1 1505 of the cell 1 may blank the subframe 1.

A BS may perform appropriate scheduling for ongoing HARQ transmissions and HARQ transmissions for applications susceptible to latency in the blanked subframes. If HARQ retransmission is expected to collide with D2D transmission in the neighboring cell, the BS may transmit HARQ ACK instead of NACK to terminate the HARQ process before reaching the blanked subframe. UE may also skip (or not perform) HARQ transmission/retransmission in a particular subframe, when it reads D2D resource configuration information of the serving cell and neighboring cells and expects that HARQ transmission/retransmission in the subframe will collide with D2D transmission of the serving cell or the neighboring cells.

In another embodiment for handling interference, BS of a cell may use D2D subframes that correspond to non-D2D subframes of a neighboring cell to allocate type 2 resources, i.e., dedicated resources. Information about the dedicated resources allocated in D2D subframes corresponding to the non-D2D subframes of the neighboring cell may be delivered to the neighboring cell. BS of the neighboring cell may then blank the dedicated resources and not schedule UE-BS communication in the non-D2D subframes.

Figure 16A:
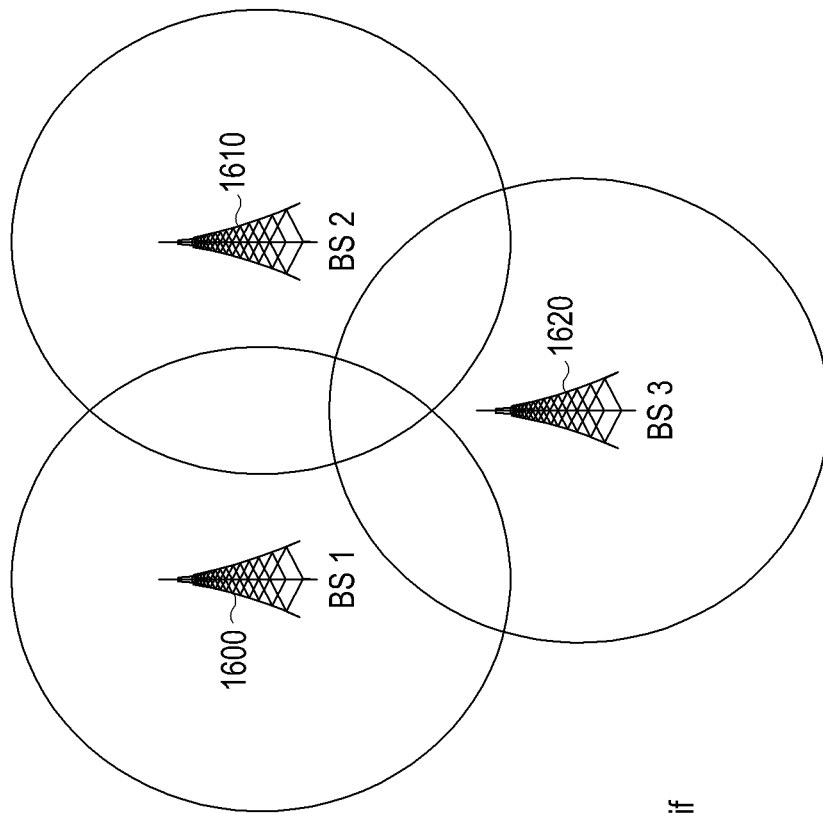
FIGS. 16A and 16B are diagrams illustrating interference handling according to an embodiment of the present disclosure.
Figure 16A:
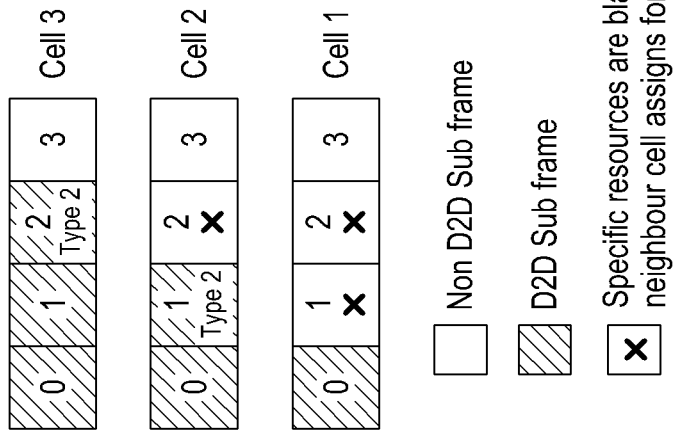
Figure 16B:
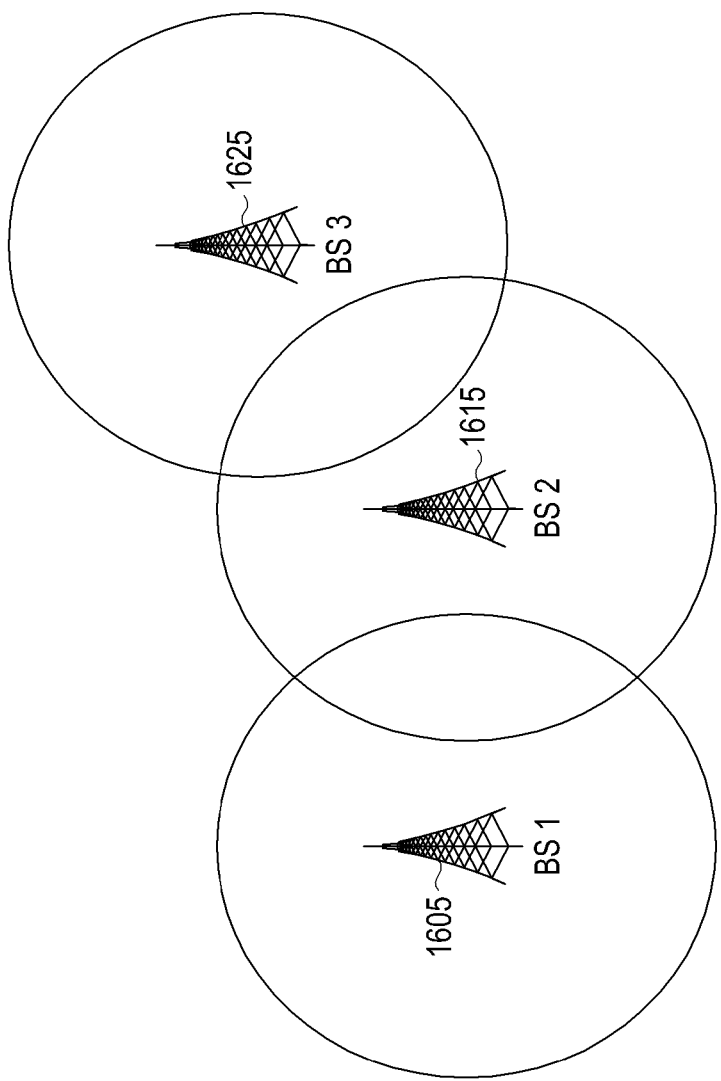

FIGS. 16A and 16B are diagrams illustrating interference handling according to an embodiment of the present disclosure.

Referring to FIG. 16A, a BS 1 1600, a BS 2 1610, and a BS 3 1620 for serving a cell 1, a cell 2, and a cell 3, respectively, are shown. D2D resources of the cell 1 of the BS 1 1600 correspond to subframe 0, D2D resources of the cell 2 of the BS 2 1610 correspond to subframes 0, 1, and D2D resources of the cell 3 of the BS 3 1620 correspond to subframes 0, 1, 2.

The cell 2 has the cell 1 and the cell 3 as its neighbors. The subframe 2 is a non-D2D subframe in the cell 1 and the cell 2 while it is a D2D subframe in the neighboring cell 3. Accordingly, the BS 3 1620 of the cell 3 may use the subframe 2 for allocation of type 2 resources. The BS 3 1620 of the cell 3 may transmit to the BS 1 1600 of the cell 1 and the BS 2 1610 of the cell 2 information about when the resource of the subframe 2 is allocated for D2D communication. In another embodiment of the present disclosure, information about resources allocated by the BS 3 1620 of the cell 3 may be transmitted to the BSs 1 and 2 1600 and 1610, respectively. The BSs 1 and 2 1600 and 1610, respectively, may then blank a particular resource indicated by the BS 3 1620 in the subframe 2, or blank the entire subframe 2 for UE-BS communication.

The subframe 1 is a non-D2D subframe in the cell 1 while it is a D2D subframe in the neighboring cell 2. Accordingly, the BS 2 1610 of the cell 2 may use the subframe 1 for allocation of type 2 resources. The BS 2 1610 of the cell 2 may transmit to the BS 1 1600 of the cell 1 information about when the resource of the subframe 1 is allocated for D2D communication. In another embodiment of the present disclosure, information about resources allocated by the BS 2 1610 of the cell 2 may be transmitted to the BS 1 1600. The BS 1 1600 may then blank a particular resource indicated by the BS 2 1610 in the subframe 1, or blank the entire subframe 1 for UE-BS communication.

Referring to FIG. 16B, a BS 1 1605, a BS 2 1615, and a BS 3 1625 for serving a cell 1, a cell 2, and a cell 3, respectively, are shown. D2D resources of the cell 1 of the BS 1 1605 correspond to subframe 0, D2D resources of the cell 2 of the BS 2 1615 correspond to subframes 0, 1, and D2D resources of the cell 3 of the BS 3 1625 correspond to subframes 0, 1, 2.

The cell 2 has the cell 1 and the cell 3 as its neighbors. The subframe 2 is a non-D2D subframe in the cell 2 while it is a D2D subframe in the neighboring cell 3. Accordingly, the BS 3 1625 of the cell 3 may use the subframe 2 for allocation of type 2 resources. The BS 3 1625 of the cell 3 may transmit to the BS 2 1615 of the cell 2 information about when the resource of the subframe 2 is allocated for D2D communication. In another embodiment of the present disclosure, information about resources allocated by the BS 3 1625 of the cell 3 may be transmitted to the BS 2 1615. The BS 2

1615 may then blank a particular resource as indicated by the BS 3 1625 in the subframe 2, or blank the entire subframe 2 for UE-BS communication.

The subframe 1 is a non-D2D subframe in the cell 1 while it is a D2D subframe in the neighboring cell 2. Accordingly, the BS 2 1615 of the cell 2 may use the subframe 1 for allocation of type 2 resources. The BS 2 1615 of the cell 2 may inform the BS 1 1605 of the cell 1 of when the resource of the subframe 1 is allocated for D2D communication. In another embodiment of the present disclosure, information about resources allocated by the BS 2 1615 of the cell 2 may be transmitted to the BS 1 1605. The BS 1 1605 may then blank a particular resource indicated by the BS 2 1615 in the subframe 1, or blank the entire subframe 1 for UE-BS communication.

A BS may perform appropriate scheduling for ongoing HARQ transmissions and HARQ transmissions for applications susceptible to latency in the blanked subframes. If HARQ retransmission is expected to collide with D2D transmission in the neighboring cell, the BS may transmit HARQ ACK instead of NACK to terminate the HARQ process. A UE may also skip HARQ transmission/retransmission in a particular subframe, when it reads D2D resource configuration information of the serving cell and neighboring cells and expects that HARQ transmission/retransmission in the subframe will collide with D2D transmission of the serving cell or the neighboring cells.

In yet another embodiment for handling interference, in a case a serving cell has D2D subframes that correspond to non-D2D subframes of the neighboring cell(s), a UE on a cell edge in the serving cell may transmit D2D signals in D2D resource zone 1. The D2D resource zone 1 is the same across all the cells. The UE may determine that it is on the cell edge when receiving signals (e.g., reference signals and/or sync signals) from different cells.

Figure 17:
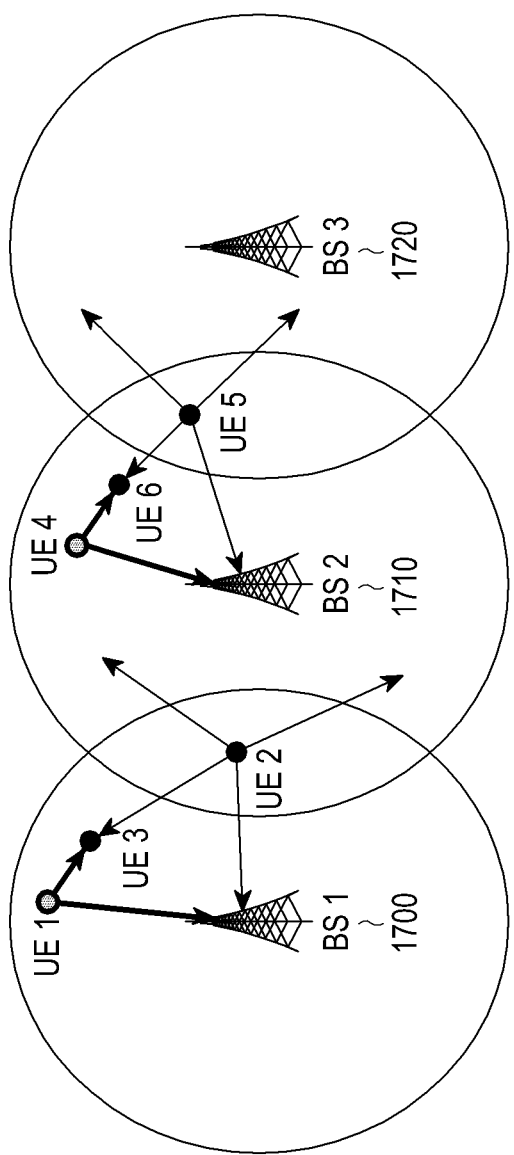
FIG. 17 is a diagram illustrating interference handling of a UE located on a cell edge according to an embodiment of the present disclosure.
Figure 17:
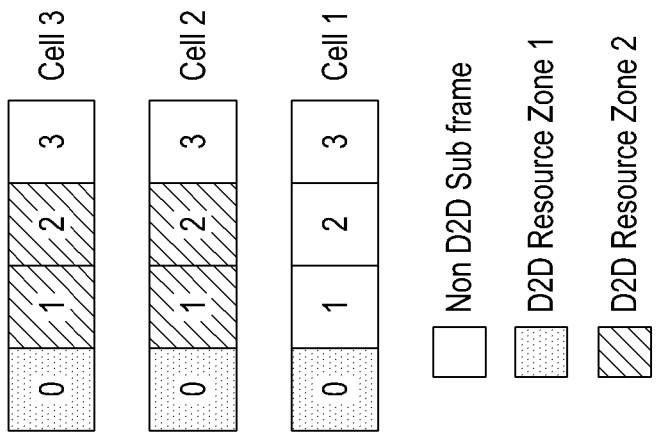

FIG. 17 is a diagram illustrating interference handling in a UE located on a cell edge according to an embodiment of the present disclosure.

Referring to FIG. 17, a BS 1 1700, a BS 2 1710, and a BS 3 1720 for serving a cell 1, a cell 2, and a cell 3, respectively, are shown. D2D resources of the cell 1 of the BS 1 1700 correspond to subframe 0, D2D resources of the cell 2 of the BS 2 1710 correspond to subframes 0, 1, 2, and D2D resources of the cell 3 of the BS 3 1720 correspond to subframes 0, 1, 2. The subframe 0 corresponds to the D2D resource zone 1, i.e., common D2D resources configured across all the cells. UEs 1 and 3 are located in the cell 1 of the BS 1 1700, a UE 2 is located in an overlapping region of the BS 1 1700 and the BS 2 1710, UEs 4 and 6 are located in the cell 2 of the BS 2 1710, and UE 5 is located in an overlapping region of the BS2 1710 and the BS 3 1720.

Since the UEs 2 and 5 belonging to the BS 2 1710 are located on the edge of the cell 2, the UEs 2 and 5 may transmit D2D signals in the D2D resource zone 1, the subframe 0. The UEs 1, 3, and 4 not located on the cell edge may transmit D2D signals in the D2D resource zone 2, the subframes 1 and 2.

The embodiment of FIG. 17 may be applied when UE is located on the cell edge of a particular neighboring cell. Based on D2D resource configuration of a serving cell and neighboring cells, UE may determine to use D2D resource zone 1 for D2D transmission when determining that it is located on the cell edge between BSs.

In the example of FIG. 17, UE 2 associated with the BS 2 1710 may use D2D resource zone 1 for D2D transmission when located on the cell edge between the BS 1 1700 and the BS 2 1710. This is because (additional) D2D subframes corresponding to (additional) D2D subframes of the BS 2 1710 do not exist for the BS 1 1700. On the other hand, UE 5 associated with the BS 2 1710 may use both the D2D resource zones 1 and 2 for D2D transmission when located on the cell edge between the BS 2 1710 and the BS 3 1720. This is because the BS 3 1720 has the same (additional) D2D subframes as those of the BS 2 1710.

In another embodiment for handling interference, a BS in a cell may provide BS(s) of neighboring cell(s) with information about resources allocated for UE-BS communication in non-D2D subframes that correspond to D2D subframes of the neighboring cell(s). BS(s) of the neighboring cell(s) may then blank the resources among its (or their respective) D2D subframes. Further, BS may use D2D subframes that correspond to non-D2D subframes in the neighboring cell for allocation of type 2 resources.

Figure 18A:
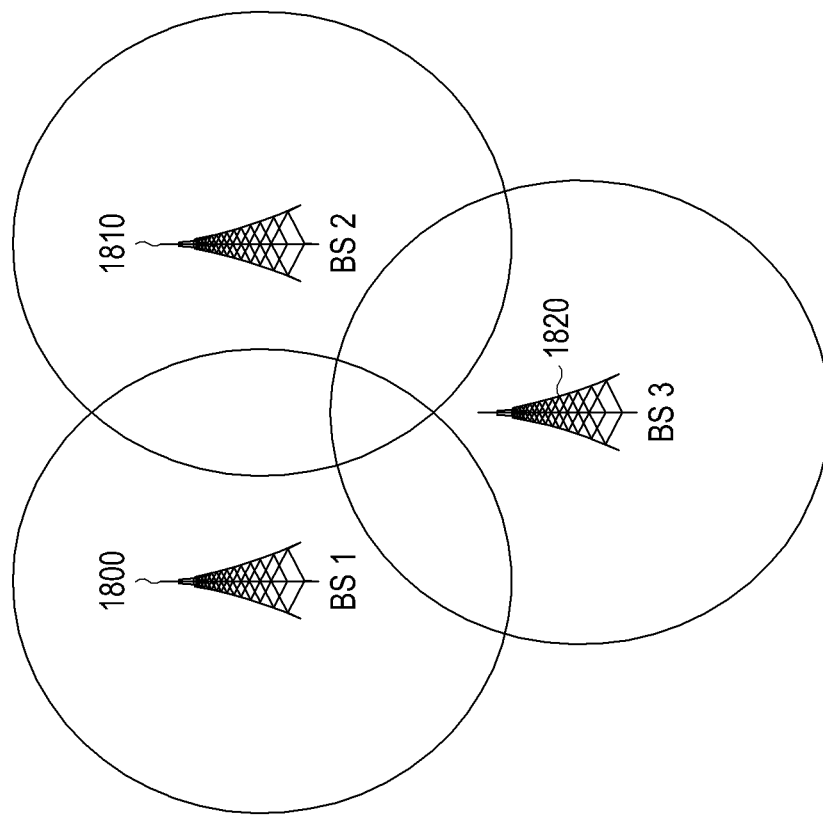
FIGS. 18A and 18B are diagrams illustrating interference handling based on an inter BS transmission according to an embodiment of the present disclosure.
Figure 18A:
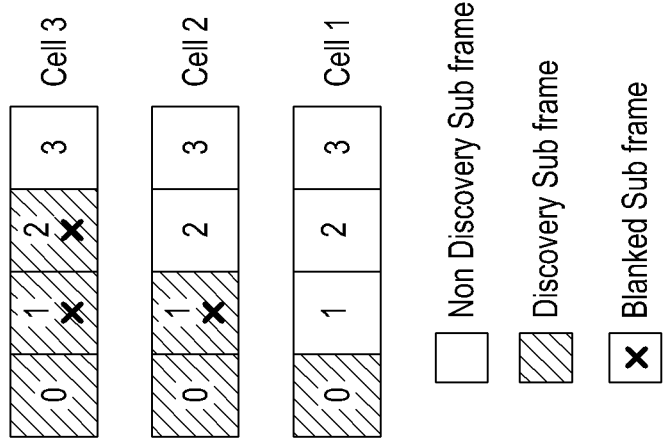
Figure 18B:
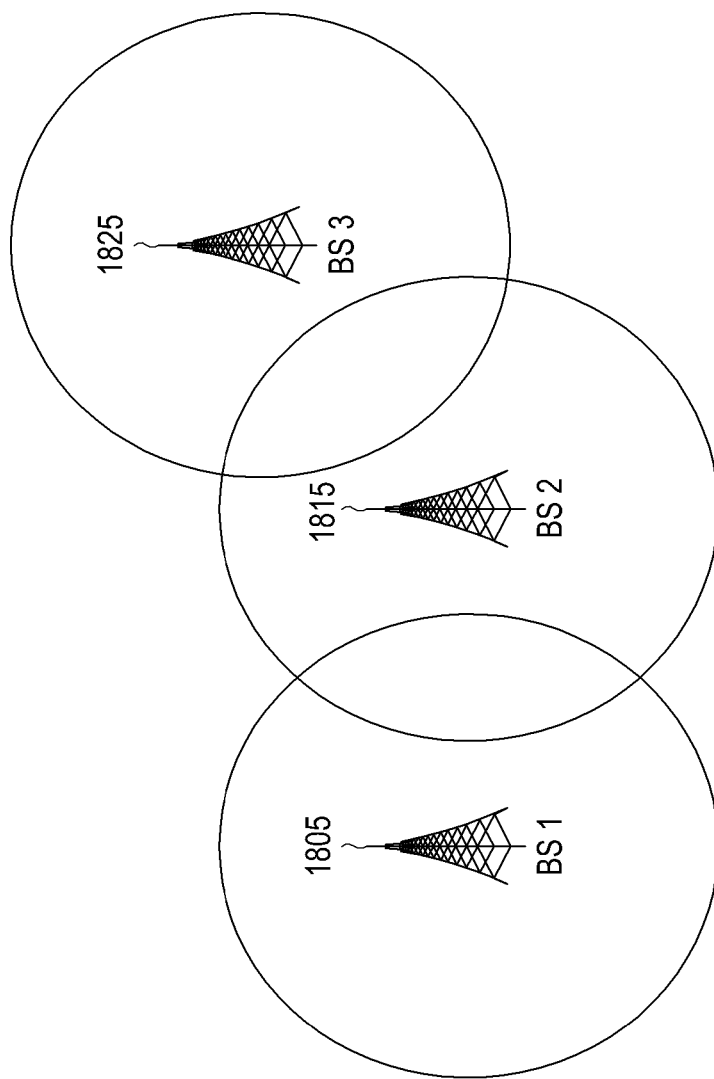
Figure 18B:
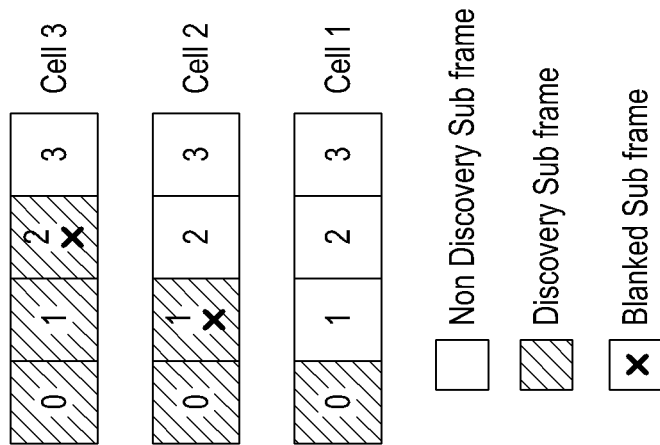

FIGS. 18A and 18B are diagrams illustrating interference handling based on inter BS communication according to an embodiment of the present disclosure.

Referring to FIG. 18A, a BS 1 1800, a BS 2 1810, and a BS 3 1820 for serving a cell 1, a cell 2, and a cell 3, respectively, are shown. D2D resources of the cell 1 of the BS 1 1800 correspond to subframe 0, D2D resources of the cell 2 of the BS 2 1810 correspond to subframes 0, 1, and D2D resources of the cell 3 of the BS 3 1820 correspond to subframes 0, 1, 2.

The cell 2 has the cell 1 and the cell 3 as its neighbors. The subframe 2 is a non-D2D subframe in the cell 2 while it is a D2D subframe in the neighboring cell 3. The BS 2 1810 of the cell 2 may transmit to the BS 3 1820 of the cell 3 information about resources allocated for UE-BS communication in the subframe 2. In another embodiment of the present disclosure, indication to indicate that resources for UE-BS communication have been allocated in the subframe 2 may be transmitted to the BS 3 1820 from the BS 2 1810. The BS 3 1820 may then blank the resources allocated in the subframe 2 and not allocate the resources for D2D communication. Alternatively, the entire subframe 2 may be blanked by the BS 3 1820.

Similarly, the subframe 1 is a non-D2D subframe in the cell 1 while it is a D2D subframe in the neighboring cells 2 and 3. The BS 1 1800 of the cell 1 may transmit to the BS 2 1810 of the cell 2 and the BS 3 1820 of the cell 3 indication to indicate that resources have been configured for UE-BS communication in the subframe 1 or information about the allocated resources. The BS 2 1810 and the BS 3 1820 may then blank the allocated resources in the subframe 1 or the entire subframe 1 not to allocate them for D2D communication.

Referring to FIG. 18B, a BS 1 1805, a BS 2 1815, and a BS 3 1825 for serving a cell 1, a cell 2, and a cell 3, respectively, are shown. D2D resources of the cell 1 of the BS 1 1805 correspond to subframe 0, D2D resources of the cell 2 of the BS 2 1815 correspond to subframes 0, 1, and D2D resources of the cell 3 of the BS 3 1825 correspond to subframes 0, 1, 2. The subframe 2 is a non-D2D subframe in the cell 2 while it is a D2D subframe in the neighboring cell 3. A BS 2 1815 of the cell 2 may transmit to a BS 3 1825 of the cell 3 indication to indicate that resources have been allocated for UE-BS communication in the subframe 2 or information about the allocated resources. The BS 3 1825 may then blank the allocated resources in the subframe 2 or the entire subframe 2 not to allocate them for D2D communication.

Similarly, the subframe 1 is a non-D2D subframe in the cell 1 while it is a D2D subframe in the neighboring cell 2. The BS 1 1805 of the cell 1 may transmit to the BS 2 1815 of the cell 2 indication to indicate that resources have been allocated for UE-BS communication in the subframe 2 or information about the allocated resources. The BS 2 1815 may then blank the allocated resources in the subframe 1 or the entire subframe 1 not to allocate them for D2D communication.

In yet another embodiment for handling interference, a cell having non-D2D subframes that correspond to D2D subframes of the neighboring cells may control power of a UE scheduled in the non-D2D subframes. For example, a BS of the cell may instruct the UE scheduled in the non-D2D subframe to reduce the transmission power level, and apply more robust coding. The more robust coding refers to a lower coding rate.

In still another embodiment for handing interference, a UE located on the cell edge of a cell having D2D subframes that correspond to non-D2D subframes of the neighboring cells may transmit a D2D signal, e.g., a discovery signal, with relatively low power in the D2D subframes (compared to other D2D subframes). For example, UE may transmit the low power D2D signal when it is located on the cell edge of a particular neighboring cell, based on D2D resource configuration in a serving cell and neighboring cell(s).

Referring to FIG. 17, the UE 2 associated with the BS 2 1710 may apply low power for transmission of D2D signals in subframes 1, 2 when located on the cell edge between the BS 1 1700 and the BS 2 1710. This is because the BS 2 1710 has D2D subframes corresponding to non-D2D subframes of the BS 1 1700, i.e., subframes 1, 2. On the other hand, UE 5 associated with the BS 2 1710 is located on the cell edge of the BS 2 1710 and the BS 3 1720, but may not apply low power for transmission of D2D signals in subframes 1, 2. This is because the BS 2 1710 has the same D2D subframes as those of the BS 3 1720.

The aforementioned embodiments may be applied separately or in a combination of two or more of them.

Figure 19:
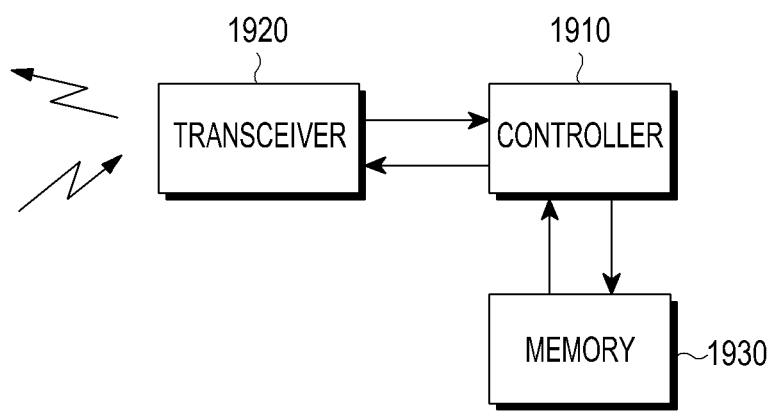
FIG. 19 is a block diagram of a UE according to an embodiment of the present disclosure.

FIG. 19 is a block diagram of a UE according to an embodiment of the present disclosure.

Referring to FIG. 19, the UE may be configured to include a controller 1910, a transceiver 1920, and a memory 1930. The transceiver 1920 may communicate uplink and/or downlink signals with a BS, and also communicate data and/or discovery signals for D2D communication with other UE(s). The controller 1910 may generate signals to be transmitted by the transceiver 1920, interpret received signals, or control operation of the transceiver 1920, according to at least one of the aforementioned embodiments. The memory 1930 may store program codes, instructions, parameters, and the like, necessary for operation of the controller 1910.

Figure 20:
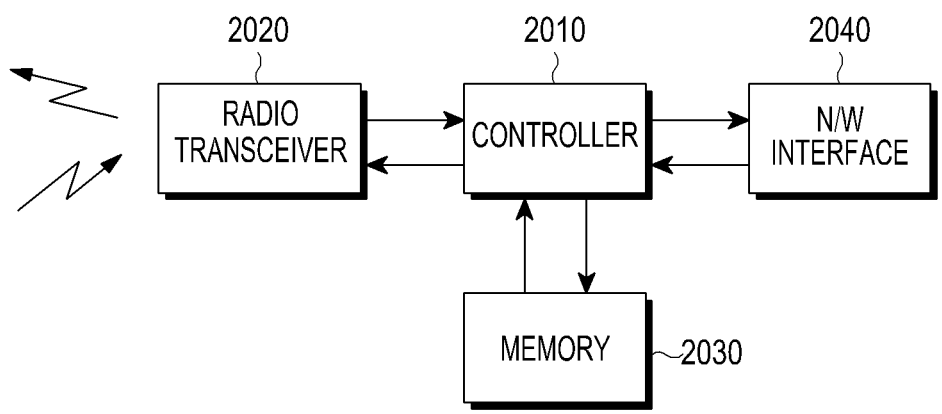
FIG. 20 is a block diagram of a BS according to an embodiment of the present disclosure.

FIG. 20 is a block diagram of a BS according to an embodiment of the present disclosure.

Referring to FIG. 20, the BS may be configured to include a controller 2010, a radio transceiver 2020, a memory 2030, and a network interface 2040. The radio transceiver 2020 may communicate uplink and/or downlink signals with a UE, and the network interface 2040 may exchange information for inter BS communication with other BS(s). The controller 2010 may generate signals and information to be transmitted from the radio transceiver 2020 and the network interface 2040, interpret received signals and information, or control operation of the radio transceiver 2020 and network interface 2040, according to at least one of the aforementioned embodiments. The memory 2030 may store program codes, instructions, parameters, and the like, necessary for operation of the controller 2010.

Various embodiments of the present disclosure may be implemented as a computer-readable codes embodied on a computer-readable recording medium from a particular perspective. The computer-readable recording medium is any data storage device that may store data readable to computer systems. Examples of the computer-readable recording medium may include read only memories (ROMs), random access memories (RAM), compact disk-read only memories (CD-ROMs), magnetic tapes, floppy disks, optical data storage devices, carrier waves (e.g., data transmission via the Internet), and the like. The computer-readable recording medium may be distributed by computer systems connected over a network, and thus the computer-readable codes may be stored and executed in distributed ways. Furthermore, functional programs, codes, and code segments for achieving various embodiments of the present disclosure may be readily interpreted by skilled programmers in the art to which embodiments of the present disclosure are applied.

It will be appreciated that the embodiments of the present disclosure may be implemented in a form of hardware, software, or a combination of hardware and software. The software may be stored as program instructions or computer readable codes executable on the processor on a non-transitory computer-readable medium. Examples of the non-transitory computer readable recording medium include magnetic storage media (e.g., a ROM, floppy disks, hard disks, and the like), and optical recording media (e.g., CD-ROMs, Digital Video Disks (DVDs), and the like). The non-transitory computer readable recording medium can also be distributed over network coupled computer systems so that the computer readable code is stored and executed in a distributed fashion. This media can be read by the computer, stored in the memory, and executed by the processor. The various embodiments may be implemented by a computer or portable terminal including a controller and a memory, and the memory may be an example of the non-transitory computer readable recording medium suitable for storing a program or programs having instructions that implement the embodiments of the present disclosure. The present disclosure may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The electronic device in accordance with the embodiments of the present disclosure may receive and store the program from a program provider connected thereto via cable or wirelessly. The program provider may include a memory for storing programs having instructions to perform the embodiments of the present disclosure, information necessary for the embodiments of the present disclosure, and the like, a communication unit for wired/wirelessly communicating with mobile devices, and a controller for transmitting the program to the mobile devices on request or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a user equipment (UE) in a wireless communication system, the method comprising:

receiving, resource configuration information from a base station, the resource configuration information comprising first information indicating device to device (D2D) transmission resources and second information indicating D2D reception resources;

transmitting a D2D discovery signal on the D2D transmission resources indicated by the first information;

monitoring the D2D reception resources indicated by the second information to receive at least one D2D discovery signal transmitted by another UE on a same frequency as a serving cell; and in case that the UE is in a connection state, transmitting, to the base station, information associated with a gap for a D2D discovery, wherein the D2D transmission resources indicated by the first information are commonly used by UEs in the serving cell, wherein the D2D reception resources indicated by the second information include both common resources and dedicated resources for D2D discovery signal reception in the serving cell and neighbor cells on the same frequency, and wherein the D2D discovery has a higher priority than uplink transmission during the gap.

2. The method of claim 1, wherein the D2D transmission resources indicated by the first information are commonly used by at least one neighbor cell.

3. The method of claim 1, wherein the D2D transmission resources are separately configured for a transmission of a D2D discovery message and a transmission of a D2D communication packet.

4. The method of claim 1, wherein the D2D reception resources are separately configured for a reception of a D2D discovery message and a reception of a D2D communication packet.

5. A method performed by a base station in a wireless communication system, the method comprising:

generating resource configuration information comprising first information indicating device to device (D2D) transmission resources and second information indicating D2D reception resources;

transmitting the resource configuration information to at least one user equipment (UE) in a serving cell; and receiving, from a UE in a connection state, information associated with a gap for a D2D discovery, wherein the D2D transmission resources are used for transmitting a D2D discovery signal by the at least one UE in the serving cell, and the D2D reception resources are used for receiving at least one D2D discovery signal transmitted by another UE on a same frequency as the serving cell, wherein the D2D transmission resources indicated by the first information are commonly used by UEs in the serving cell, wherein the D2D reception resources indicated by the second information include both common resources and dedicated resources for D2D discovery signal reception in the serving cell and neighbor cells on the same frequency, and wherein the D2D discovery has a higher priority than uplink transmission during the gap.

6. The method of claim 5, wherein the D2D transmission resources indicated by the first information are commonly used by at least one neighbor cell.

7. The method of claim 5, wherein the D2D transmission resources are separately configured for a transmission of a D2D discovery message and a transmission of a D2D communication packet.

8. The method of claim 5, wherein the D2D reception resources are separately configured for a reception of a D2D discovery message and a reception of a D2D communication packet.

9. A user equipment (UE) in a wireless communication system, the UE comprising:

a transceiver; and at least one processor coupled with the transceiver and configured to:

receive resource configuration information from a base station via the transceiver, the resource configuration information comprising first information indicating device to device (D2D) transmission resources and second information indicating D2D reception resources, transmit, via the transceiver, a D2D discovery signal on the D2D transmission resources indicated by the first information, monitor the D2D reception resources indicated by the second information to receive at least one D2D discovery signal transmitted by another D2D UE on a same frequency as a serving cell, and in case that the UE is in a connection state, transmit, to the base station via the transceiver, information associated with a gap for a D2D discovery, wherein the D2D transmission resources indicated by the first information are commonly used by UEs in the serving cell, wherein the D2D reception resources indicated by the second information include both common resources and dedicated resources for D2D discovery signal reception in the serving cell and neighbor cells on the same frequency, and wherein the D2D discovery has a higher priority than uplink transmission during the gap.

10. The UE of claim 9, wherein the D2D transmission resources indicated by the first information are commonly used by at least one neighbor cell.

11. The UE of claim 9, wherein the D2D transmission resources are separately configured for a transmission of a D2D discovery message and a transmission of a D2D communication packet.

12. The UE of claim 9, wherein the D2D reception resources are separately configured for a reception of a D2D discovery message and a reception of a D2D communication packet.

13. A base station in a wireless communication system, the base station comprising:

a transceiver; and at least one processor coupled with the transceiver and configured to:

generate resource configuration information comprising first information indicating device to device (D2D) transmission resources and second information indicating D2D reception resources, transmit, via the transceiver, the resource configuration information to at least one user equipment (UE) in a serving cell, and receive, from a UE in a connection state via the transceiver, information associated with a gap for a D2D discovery, wherein the D2D transmission resources are used for transmitting a D2D discovery signal by the at least one UE in the serving cell, and the D2D reception resources are used for receiving at least one D2D discovery signal transmitted by another UE on a same frequency as the serving cell, wherein the D2D transmission resources indicated by the first information are commonly used by UEs in the serving cell, wherein the D2D reception resources indicated in the second information include both common resources and dedicated resources for D2D discovery signal reception in the serving cell and neighbor cells on the same frequency, and wherein the D2D discovery has a higher priority than uplink transmission during the gap.

14. The base station of claim 13, wherein the D2D transmission resources indicated by the first information are commonly used by at least one neighbor cell.

15. The apparatus-base station of claim 13, wherein the D2D transmission resources are separately configured for a transmission of a D2D discovery message and a transmission of a D2D communication packet.

16. The base station of claim 13, wherein the D2D reception resources are separately configured for a reception of a D2D discovery message and a reception of a D2D communication packet.

* * * * *